US011895457B2

(12) United States Patent
Clayton et al.

(10) Patent No.: US 11,895,457 B2
(45) Date of Patent: Feb. 6, 2024

(54) HEADPHONE INTERACTION WITH MEDIA PLAYBACK SYSTEM

(71) Applicant: Sonos, Inc., Santa Barbara, CA (US)

(72) Inventors: Eric Clayton, Concord, MA (US); Charles Alessi, Litchfield, NH (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/308,911

(22) Filed: Apr. 28, 2023

(65) Prior Publication Data

US 2023/0388694 A1 Nov. 30, 2023

Related U.S. Application Data

(63) Continuation of application No. 17/385,564, filed on Jul. 26, 2021, now Pat. No. 11,641,539, which is a
(Continued)

(51) Int. Cl.
*H04R 1/10* (2006.01)
*G06F 3/16* (2006.01)
(Continued)

(52) U.S. Cl.
CPC ......... *H04R 1/1041* (2013.01); *G06F 3/0482* (2013.01); *G06F 3/165* (2013.01);
(Continued)

(58) Field of Classification Search
CPC ................ H04R 1/1041; H04R 27/00; H04R 2227/003; H04R 2227/005;
(Continued)

(56) References Cited

U.S. PATENT DOCUMENTS

| 5,440,644 A | 8/1995 | Farinelli et al. |
| 5,761,320 A | 6/1998 | Farinelli et al. |
| (Continued) | | |

FOREIGN PATENT DOCUMENTS

| CN | 105850094 A | 8/2016 |
| CN | 105917302 A | 8/2016 |
| (Continued) | | |

OTHER PUBLICATIONS

AudioTron Quick Start Guide, Version 1.0, Mar. 2001, 24 pages.
(Continued)

*Primary Examiner* — Yosef K Laekemariam
(74) *Attorney, Agent, or Firm* — Fortem IP LLP; Benjamin Urban

(57) ABSTRACT

Example techniques may involve headphone interaction. An implementation may include while headphones are disconnected from a control device, the control device receiving an indication of particular audio content being played back by a first zone of the media playback system. While the particular audio content is being played back by the one or more playback devices of the media playback system, detecting that headphones have been connected to the first control device. Headphones may be connectable to the control device via either (a) an analog headphone jack or (b) a point-to-point personal area network connection. In response to detecting that the headphones are connected to the control device: the control device (i) causing the one or more playback devices of the first zone to stop playback of the particular audio content; (ii) retrieving the particular audio content and (iii) resuming playback of the particular audio content via the connected headphones.

20 Claims, 13 Drawing Sheets

Related U.S. Application Data continuation of application No. 16/845,988, filed on Apr. 10, 2020, now Pat. No. 11,076,216, which is a continuation of application No. 15/939,758, filed on Mar. 29, 2018, now Pat. No. 10,623,844.

(51) Int. Cl.
*G06F 3/0482* (2013.01)
*H04R 27/00* (2006.01)

(52) U.S. Cl.
CPC ....... *H04R 27/00* (2013.01); *H04R 2227/003* (2013.01); *H04R 2227/005* (2013.01); *H04R 2420/03* (2013.01); *H04R 2420/05* (2013.01); *H04R 2420/07* (2013.01)

(58) Field of Classification Search
CPC ............ H04R 2420/03; H04R 2420/05; H04R 2420/07; G06F 3/0482; G06F 3/165
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 8,995,687 | B2 * | 3/2015 | Marino, Jr. .............. H04R 3/12 381/103 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2009/0063974 | A1* | 3/2009 | Bull ...................... G06F 16/683 715/854 |
| 2009/0169030 | A1 | 7/2009 | Inohara |
| 2014/0266637 | A1* | 9/2014 | Alsina .................... G06F 3/165 340/12.26 |
| 2014/0363024 | A1 | 12/2014 | Apodaca |
| 2015/0256926 | A1 | 9/2015 | Kim et al. |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and Translation dated Jun. 3, 2021, issued in connection with Chinese Application No. 201980036290.6, 13 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability and Written Opinion, dated Oct. 8, 2020, issued in connection with International Application No. PCT/US2019/024657, filed on Mar. 28, 2019, 23 pages.
International Bureau, International Search Report and Written Opinion dated Oct. 29, 2019, issued in connection with International Application No. PCT/US2019/024657, filed on Mar. 28, 2019, 27 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 26, 2019, issued in connection with U.S. Appl. No. 15/939,758, filed Mar. 29, 2018, 11 pages.
Non-Final Office Action dated Aug. 6, 2020, issued in connection with U.S. Appl. No. 16/845,988, filed Apr. 10, 2020, 9 pages.
Notice of Allowance dated Mar. 22, 2021, issued in connection with U.S. Appl. No. 16/845,988, filed Apr. 10, 2020, 9 pages.
Notice of Allowance dated Dec. 11, 2019, issued in connection with U.S. Appl. No. 15/939,758, filed Mar. 29, 2018, 8 pages.
Notice of Allowance dated Dec. 22, 2022, issued in connection with U.S. Appl. No. 17/385,564, filed Jul. 26, 2021, 8 pages.
Notice of Allowance dated Dec. 3, 2020, issued in connection with U.S. Appl. No. 16/845,988, filed Apr. 10, 2020, 8 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

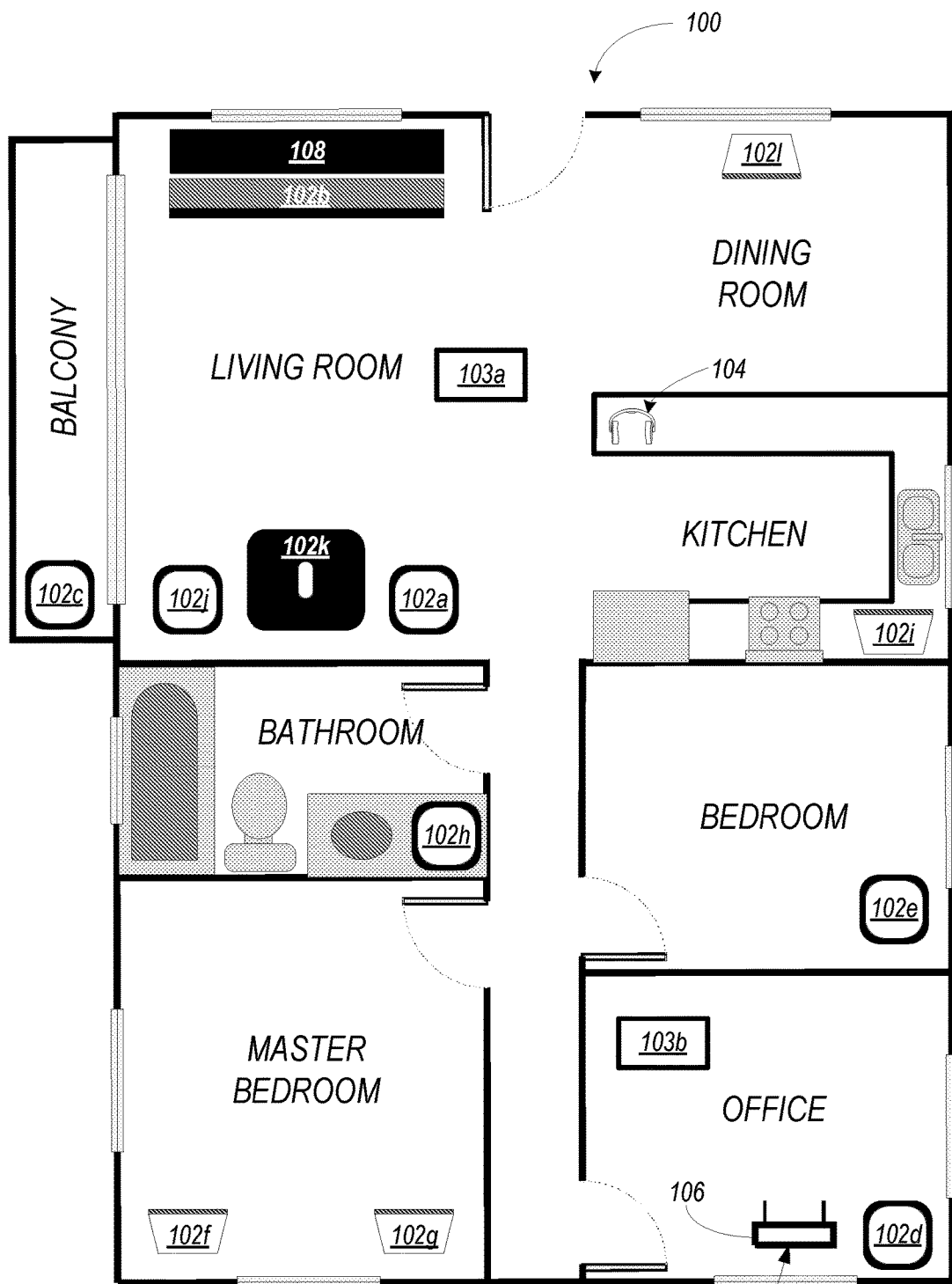
FIGURE 1
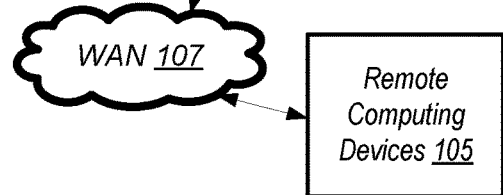

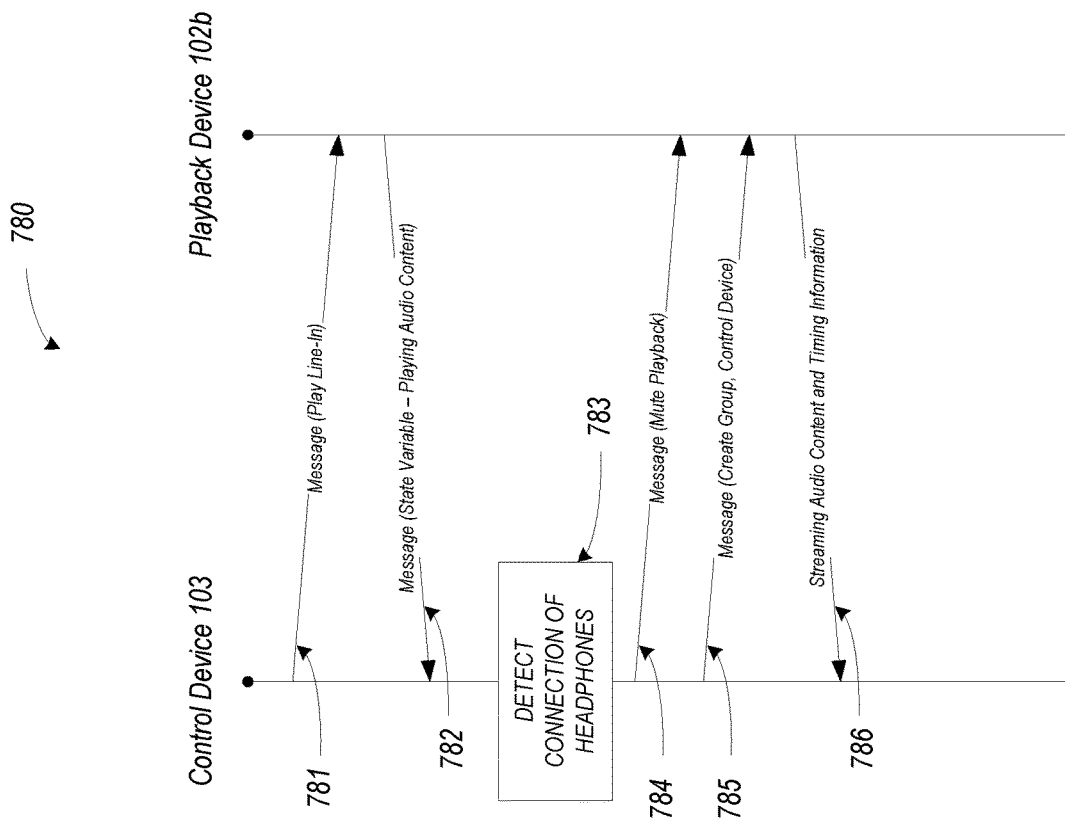

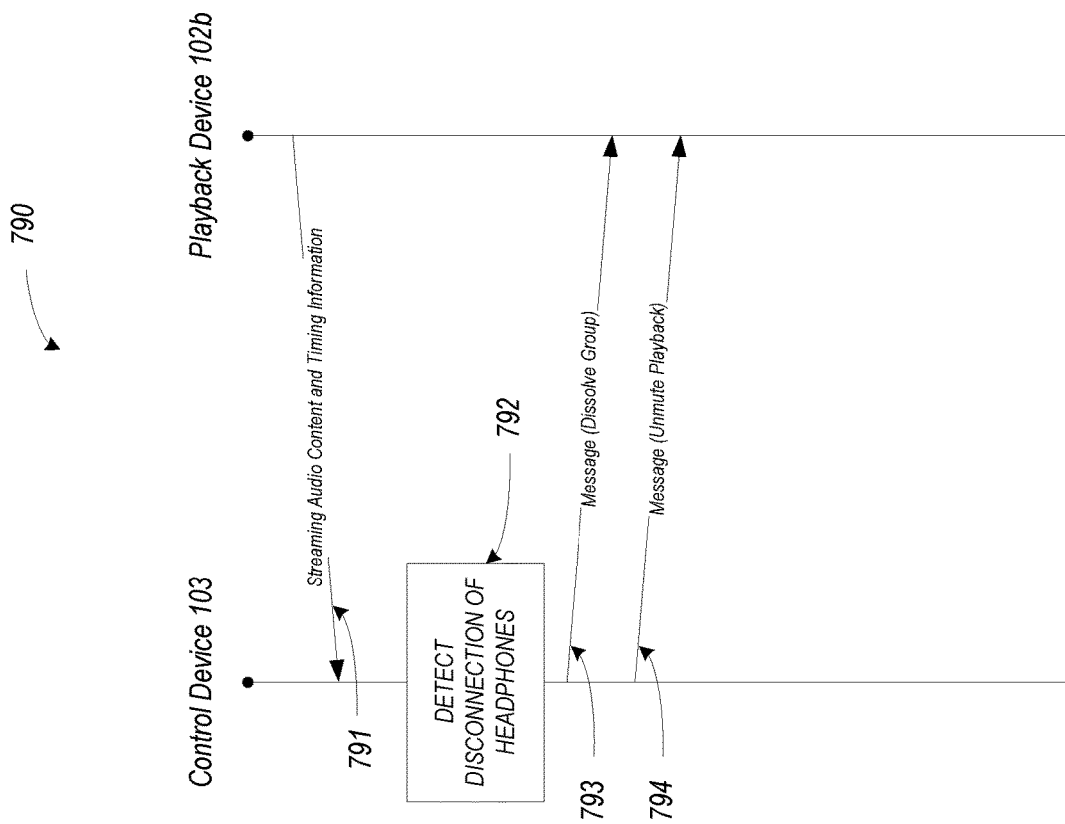

HEADPHONE INTERACTION WITH MEDIA PLAYBACK SYSTEM

CROSS REFERENCE TO RELATED APPLICATIONS

This application is a continuation of U.S. patent application Ser. No. 17/385,564, filed Jul. 26, 2021, which is a continuation of U.S. patent application Ser. No. 16/845,988, filed Apr. 10, 2020, now U.S. Pat. No. 11,076,216, which is a continuation of U.S. patent application Ser. No. 15/939,758, filed Mar. 29, 2018, now U.S. Pat. No. 10,623,844, each application is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 1 shows an example media playback system configuration in which certain embodiments may be practiced;

FIG. 7B is an example message flow diagram in accordance with aspects of the disclosure;

FIG. 7C is another example message flow diagram in accordance with aspects of the disclosure;

Figure 2:
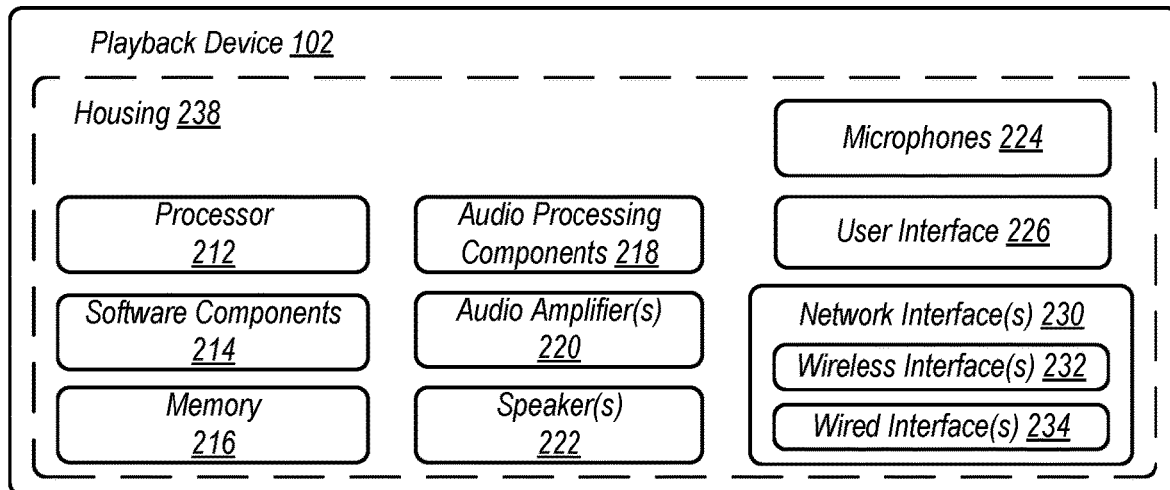
FIG. 2 shows a functional block diagram of an example playback device in accordance with aspects of the disclosure.

The drawings are for the purpose of illustrating example embodiments, but it is understood that the inventions are not limited to the arrangements and instrumentality shown in the drawings.

DETAILED DESCRIPTION

I. Overview

Examples implementations described herein involve interactions between a media playback system that includes one or more playback devices that are designed to play audio content out loud and headphones, which are connectable to personal devices. Example personal devices, such as smartphones, tablets, and laptops, may execute various media playback applications that facilitate playing back music content via headphones connected to the personal device. Such personal devices may also execute a control application that facilitates remote control of the media playback system. Example implementations may facilitate transitioning between playback of out loud audio content on the one or more playback devices and headphone playback of the audio content.

For example, as noted above, a personal device may execute a control application to control playback devices of a media playback system. Such a personal device may be referred to as a "control device." The control device, by way of the control application, may display a control interface that includes playback controls (e.g., transport controls such as play, pause, or skip track) to remotely control audio content playback by the media playback system, as well as search and browse controls to select audio content for playback on the media playback system. The control interface may also include contextual information about the media playback system, such as metadata of the audio content currently playing back and as the name(s) of playback devices within the media playback system that are playing back the audio content, among other examples.

While particular audio content (e.g., an audio track) is being played back on one or more playback devices of the media playback system, a control device may detect that headphones have been connected to the control device (e.g., via an analog headphone jack or a point-to-point personal area connection, such as Bluetooth®). In response to detecting the connection of headphones, the control device transitions playback from the one or more playback devices of the media playback system to playback on the control device via the headphones. In particular, the control device instructs the one or more playback devices to stop (or mute) playback of the particular audio content. The control device also retrieves the audio content from the audio source that was providing the particular audio content to the one or more playback devices and resumes playing the particular audio content via the one or more headphones. The audio source may be an audio streaming service, such as Pandora® and Spotify®. Alternatively, the audio source may be a television or other line-in connected devices (e.g. a vinyl player) from which the one or more playback devices are retrieving audio content.

The control device may also facilitate transitioning playback to the one or more playback devices. For instance, while playing back particular audio content via the headphones, a control device may detect that the headphones have been disconnected from the control device. In response to detecting the disconnection of the headphones, the control device transitions playback from the control device via the headphones to playback on the one or more playback devices of the media playback system. In particular, the control device stops playback of the particular audio content on the control device. The control device also instructs the one or more playback devices to resume playing the particular audio content, perhaps after receiving confirmation that playback should be resumed via a selectable control displayed on the control interface.

To illustrate, in one example, a first user and a second user may begin watching a TV show or movie on a television that is configured to output sound through a playback device of a media playback system. In examples herein, the playback device outputting sound for the television may be a soundbar-type playback device configured with HDMI, optical digital or other audio input from a television or the like. If the first user decides to go to sleep, the second user, to avoid disturbing the sleeping user, may plug in headphones to their smartphone (which is also a control device for the given playback device). When the smartphone detects connection of the headphones, the smartphone instructs the soundbar-type playback device to stop playing back the television audio (e.g., by muting the output). The control device resumes playback via the connected headphones by retrieving the television audio from the source, which in this example may be through the soundbar-type playback device, as this device is connected to the television or content source. As noted above, if the audio source is a network location remote from the playback device, the control device may retrieve the audio content directly from that source (e.g., from a server of a streaming audio service).

Continuing the above-example, the second user may intentionally or unintentionally disconnect the headphones from his smartphone, which may cause the smartphone to transition playback of the television audio back to the soundbar-type playback device. To avoid a disturbance from out loud playback on the soundbar-type playback device, the smartphone may display a selectable control prompting the second user to confirm that playback should resume on the soundbar-type playback device. The smartphone may additionally display a selectable control to optionally adjust a playback volume when playback resumes on the soundbar-type playback device. When the selectable control is selected, the smartphone stops playback via the headphones and instructs the soundbar-type playback device to play back the television audio.

In some implementations, the control device may automatically transition playback based on a policy. For instance, an example policy may cause the control device to automatically transition playback during daytime hours (e.g., 8 AM to 9 PM) and prompt for confirmation during nighttime hours (e.g., 9 PM to 8 AM). The control interface of the control application may include controls to set such policies for the media playback system. Different playback devices may have different policies (e.g., a playback device in the bedroom might be programed with different hours than a playback device in a basement den).

In some examples, a playback device may facilitate transition of audio playback. For instance, a playback device may receive, from a control device, an instruction to play back audio content. In response, the playback device retrieves and plays back the audio content. While playing back the audio content, the playback device may receive, from the control device, a message indicating that headphones are connected to the control device of the media playback system. In response, the playback device stops playback of the retrieved audio content and causes the control device to play back the audio content via the first headphones.

As noted above, example techniques may involve headphone interactions with a media playback system. Example implementations described herein may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

A first implementation may include while headphones are disconnected from a first control device, receiving, via a network interface of the first control device, an indication of particular audio content being played back by a first zone of the media playback system, wherein the first zone comprises one or more playback devices that are separate and distinct from the first control device and connected to the first control device via a local area network; while the particular audio content is being played back by one or more playback devices of the media playback system, detecting that headphones have been connected to the first control device, wherein headphones are connectable to the first control device via either (a) an analog headphone jack of the first control device or (b) a point-to-point personal area network connection via a personal area network interface of the first control device; and in response to detecting that the headphones are connected to the first control device of the media playback system: (i) causing, via the network interface of the first control device, the one or more playback devices of the first zone to stop playback of the particular audio content; (ii) retrieving, via the network interface of the first control device, the particular audio content from an audio source that is remote from the first control device; and (iii) resuming playback of the particular audio content via the connected headphones.

A second implementation may include receiving, via a network interface from a first control device of the media playback system, an instruction to play back audio content; in response to receiving the instruction to play back audio content, (i) retrieving, via an I/O interface, the audio content from an audio source that is remote from the playback device and (ii) playing back the retrieved audio content via the audio stage and the one or more speakers; while playing back the retrieved audio content via the audio stage and the one or more speakers, receiving, via the network interface from the first control device, a message indicating that first headphones are connected to the first control device of the media playback system; and in response to receiving the message indicating that the first headphones are connected to the first control device of the media playback system: (i) stopping playback of the retrieved audio content via the audio stage and the one or more speakers and (ii) causing, via the network interface, the first control device to play back the audio content via the first headphones.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. For the sake of brevity, functions are generally described as being based on another function when a functional link exists; however, disclosure of "based on" or "in response to" should be understood as disclosing either type of functional relationship. In the claims, "based on" should be understood that one element or function is related to another function or element and "in response to" should be understood as one element or function being a necessary result of another function or element.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m) and control devices 103a and 103b (collectively "control devices 103"). In various examples, a pair of headphones 104 may be connected to the control device 103.

The various playback and control devices 102-103 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) 105 may be cloud servers. The remote computing device(s) 105 may be configured to interact with the media playback system 100 in various ways. For example, the remote computing device(s) may be configured to facilitate streaming and controlling playback of media content, such as audio, in the home environment, perhaps as part of providing a streaming audio service via WAN 107. In some examples, the remote computing device(s) 105 may be representative of cloud servers from multiple services, perhaps operated by different entities.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback and/or control devices 102-103. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

FIG. 2 is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, microphone(s) 224, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device may include neither the speaker(s) 222 nor the audio amplifier(s) 222, but rather an line-out interface for connecting a playback device to an external audio amplifier or audio-visual receiver. The playback device includes a housing 238 carrying its constituent components.

A playback device may further include a user interface 226. The user interface 226 may facilitate user interactions independent of or in conjunction with one or more of the control devices 103. In various embodiments, the user interface 226 includes one or more of physical buttons and/or graphical user interfaces provided on touch sensitive screen(s) and/or surface(s), among other possibilities, for a user to directly provide input. The user interface 226 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 might include only wireless interface(s) or only wired interface(s) in various examples.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 102a, 102b, 102j, and 102k may be configured to play audio content in synchrony as individual playback devices, as one or more bonded playback devices, as one or more consolidated playback devices, or any combination thereof. Similarly, in the case of the master bedroom, playback devices 102f and 102g may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102c while another user may be preparing food in the kitchen zone and listening to classical music being played by the playback device 102i. In another example, a playback zone may play the same audio content in synchrony with another playback zone. For instance, the user may be in the office zone where the playback device 102d is playing the same rock music that is being playing by playback device 102c in the balcony zone. In such a case, playback devices 102c and 102d may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102c from the balcony zone to the office zone, the office zone may now include both the playback device 102d and the playback device 102c. The playback device 102 may be paired or grouped with the office zone and/or renamed if so desired via a control device such as the control devices 103a and 103b. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 102i and 102l may render audio content in synchrony. On the other hand, the living room zone may be split into a television zone including playback device 102b, and a listening zone including playback devices 102a, 102j, and 102k, if the user wishes to listen to music in the living room space while another user wishes to watch the television 108.

In some implementations, the playback devices 102 of media playback system 100 may be arranged into a smart home hierarchy referred to as Home Graph. The base unit of the home graph hierarchy is a "Set." For the purpose of this disclosure, a "Set" refers to an individual device or multiple devices that operate together in performing a given function. For instance, a bonded zone of audio playback devices (e.g., a stereo pair or surround sound configuration) function together in playing back audio content by playing back respective channels or portions of that content. As another example, multiple smart lightbulbs in the same light fixture function together in providing illumination from that light fixture. To individually control different smart devices, each of these smart devices may be assigned into a respective Set.

The next level of the Home Graph hierarchy is a "Room." Under the example home graph hierarchy described herein, a "Room" can be considered a container for Sets in a given room of a home. For example, an example Room might correspond to the kitchen of a home, and be assigned the name "Kitchen." The afore-mentioned Sets having the names "Kitchen Island" and "Kitchen Lights" may belong to the Room.

Under home graph, Sets within the room container may be referred to by the name of the room. For instance, the voice command "Play music in Kitchen" causes the "Kitchen Island" Set (which includes an audio playback device) to start playing music. If there are multiple Sets in the Kitchen that include audio playback devices, the voice command "Play music in Kitchen" invokes every Set in the "Kitchen" Room that includes an audio playback device. If control of an individual Set is desired, that Set may be selected by reference to its name (e.g., "Kitchen Island") rather than the name of the Room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "upstairs" and "downstairs," which include the Rooms upstairs and the Rooms downstairs in the home, respectively. Under a second example, an area contains two or more sets (possibly in different Rooms).

The highest level of the home graph hierarchy is "Home." A Home refers to the entire home, and all of the Sets within. In some implementations, the Home may be referred to by reference to "everywhere." For the purposes of this disclosure, the terms "Set," "Room," "Area" and "Home" are capitalized when referring to levels of the home graph hierarchy so as to distinguish from the common usage of these terms. Moreover, human-readable names (i.e., character strings) are used in identifying Sets, Rooms, Areas, and Home and are denoted by quotations marks (e.g., "Nick's Room" Set).

c. Example Control Devices

Figure 3:
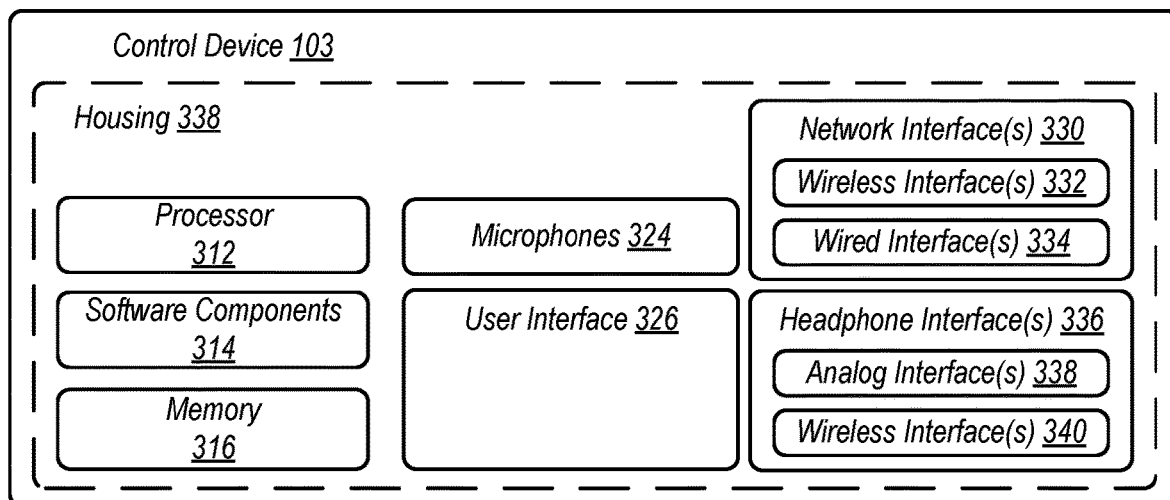
FIG. 3 shows a functional block diagram of an example control device in accordance with aspects of the disclosure.

FIG. 3 is a functional block diagram illustrating certain aspects of a selected one of the controller devices 103 of the media playback system 100 of FIG. 1. Such controller devices may also be referred to as a controller or a control device. The controller device shown in FIG. 3 may include components that are generally similar to certain components of the network devices described above, such as a processor 312, memory 316, and a network interface 330. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™) The control device 103 includes a housing 338 carrying its constituent components.

The memory 316 of the control device 103 may be configured to store controller application software and other data associated with the media playback system 100 and a user of the system 100. The memory 316 may be loaded with one or more software components 314 executable by the processor 312 to achieve certain functions, such as facilitating user access, control, and configuration of the media playback system 100. The control device 103 communicates with other network devices over the network interface 330, such as a wireless interface, as described above.

The control device 103 may include a plurality of microphones arranged to detect sound in the environment of the control device 103. The microphones may detect voice inputs to the media playback system 100, process those inputs, perhaps using one or more VAS s, and carry out the commands on one or more playback devices 102.

Playback device control commands such as volume control and audio playback control may also be communicated from a control device to a playback device via the network interface 330. As suggested above, changes to configurations of the media playback system 100 may also be performed by a user using the control device. The configuration changes may include adding/removing one or more playback devices to/from a zone, adding/removing one or more zones to/from a zone group, forming a bonded or merged player, separating one or more playback devices from a bonded or merged player, among others.

In one example, data and information (e.g., such as a state variable) may be communicated between a control device and other devices via the network interface 330. For instance, playback zone and zone group configurations in the media playback system 100 may be received by a control device from a playback device, another control device, or another network device, or transmitted by the control device to another playback device or control device via the network interface 330. In some cases, the other network device may be another control device.

The headphone interface(s) 336 may include analog interface(s) 338 and/or wireless interface(s) 340. The analog interface(s) 338 may include a headphone jack (also known as a phone connector) in 2.5 mm or 3.5 mm connectors, among other examples. Such a headphone jack connects to an audio chipset of the control device 300, which may be integrated into the processor 312 for instance, perhaps as part of a system-on-a-chip (SOC). Output from the audio chipset is provided to headphones connected to the analog interface(s) 338 to drive the headphones in producing audio output. The wireless interface(s) 340 may include a personal area network (PAN) network interface that supports a standard such as Bluetooth® SIG (formally standardized as IEEE 802.15.1). Via the wireless interface(s) 340, the control device 300 may form a wireless point-to-point connection with compatible headphones to provide audio to the headphones for playback.

Control device 300 may maintain a state variable indicating whether headphones are connected to the headphone interface(s) 336. In particular, connection or disconnection of headphones to analog interface(s) 338 may complete or disconnect a circuit (e.g., a circuit including the amplifier output of the audio chipset), which in turn triggers updating of the state variable to indicate whether headphones are connected. As another example, when headphones are connected to the wireless interface(s) 340, a headset-specific profile, such as Advanced Audio Distribution Profile (A2DP) may be used. Use of the A2DP profile with a Bluetooth® compatible device may cause the state variable to indicate that headphones are connected. Other examples are possible as well.

Figures 4A, 4B:
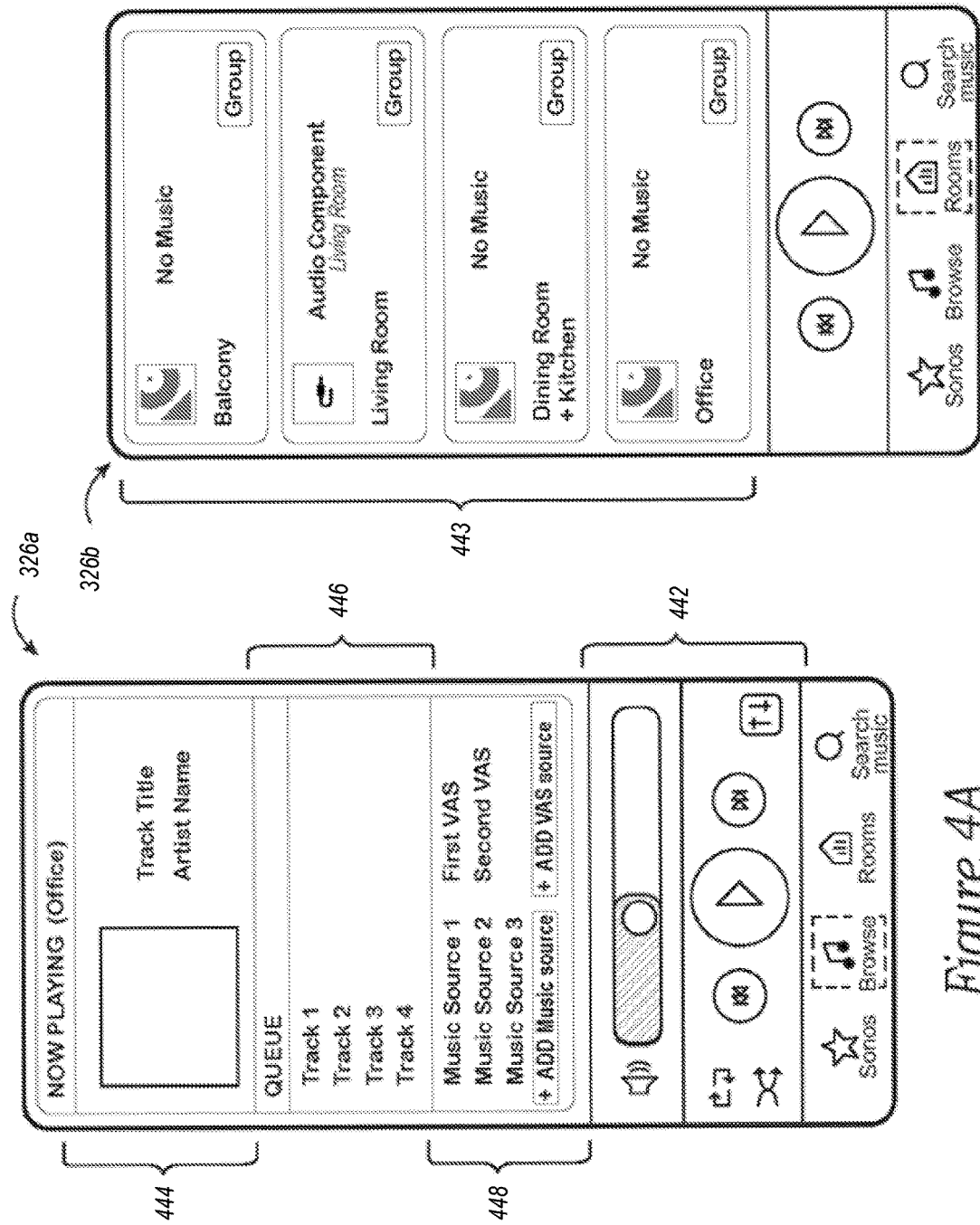
FIGS. 4A and 4B are example controller interfaces in accordance with aspects of the disclosure.

The user interface(s) 326 of a control device may be configured to facilitate user access and control of the media playback system 100, by providing controller interface(s) such as the controller interfaces 326a and 326b shown in FIGS. 4A and 4B, respectively, which may be referred to collectively as the controller interface 326. Referring to FIGS. 4A and 4B together, the controller interface 326 includes a playback control region 442, a playback zone region 443, a playback status region 444, a playback queue region 446, and a sources region 448. The user interface 326 as shown is just one example of a user interface that may be provided on a network device such as the control device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. The playback zones regions may also include representation of zone groups, such as the Dining Room+ Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 326 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 426.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

d. Example Audio Content Sources

The sources region 448 (FIG. 4A) may include graphical representations of selectable audio content sources and voice assistant services (VAS). The audio sources in the sources region 348 may be audio content sources from which audio content may be retrieved and played by the selected playback zone or zone group. One or more playback devices in a zone or zone group may be configured to retrieve for playback audio content (e.g., according to a corresponding uniform resource identifier (URI) or uniform resource locator (URL) for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

III. Example Headphone Interactions

Figure 5A:
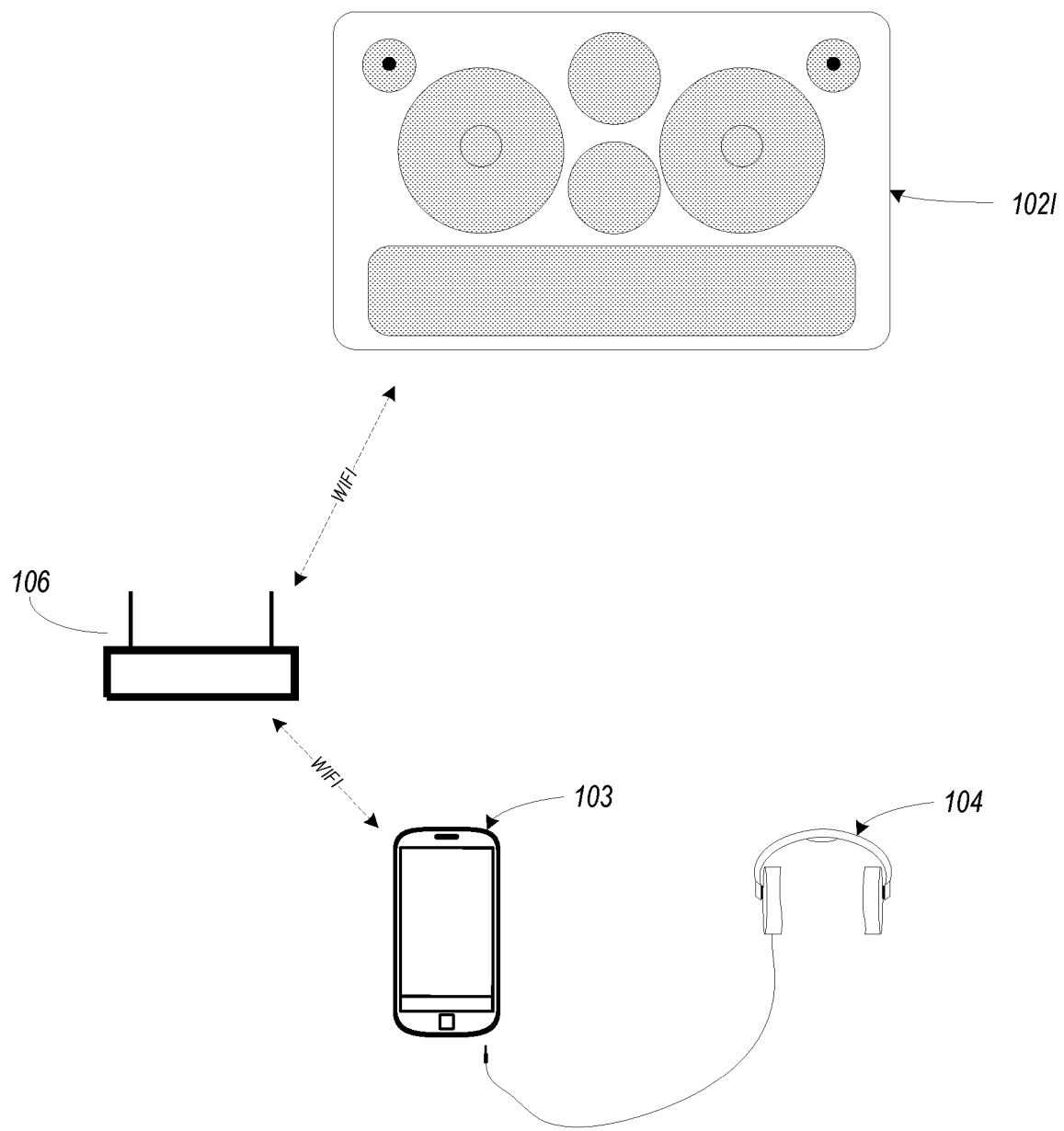
FIG. 5A shows an example system that illustrates example headphone interactions accordance with aspects of the disclosure.

FIG. 5A illustrates an example configuration of a system in which example headphone interactions may be practiced. As shown, the system of FIG. 5A includes the playback device 102*l* of media playback system 100, a control device 103, headphones 104, and a network router 106. In operation, connection of the headphones 104 to the control device 103 causes the control device 103 to transition playback of audio content from the playback device 102*l* to the control device 103 (via the headphones 104). Similarly, disconnection of the headphones 104 from the control device 103 causes the control device 103 to transition playback of audio content from the control device 103 (via the headphones 104) to the playback device 102*l*.

In FIG. 5A, the playback device 102*l* and the control device 103 are connected via the router 106. In alternative implementations, these devices may directly connect via a point-to-point network such as an ad-hoc WiFi® network or a Bluetooth® connection. Other types of connections that facilitate exchange of instructions and/or content may be implemented as well.

Figure 5B:
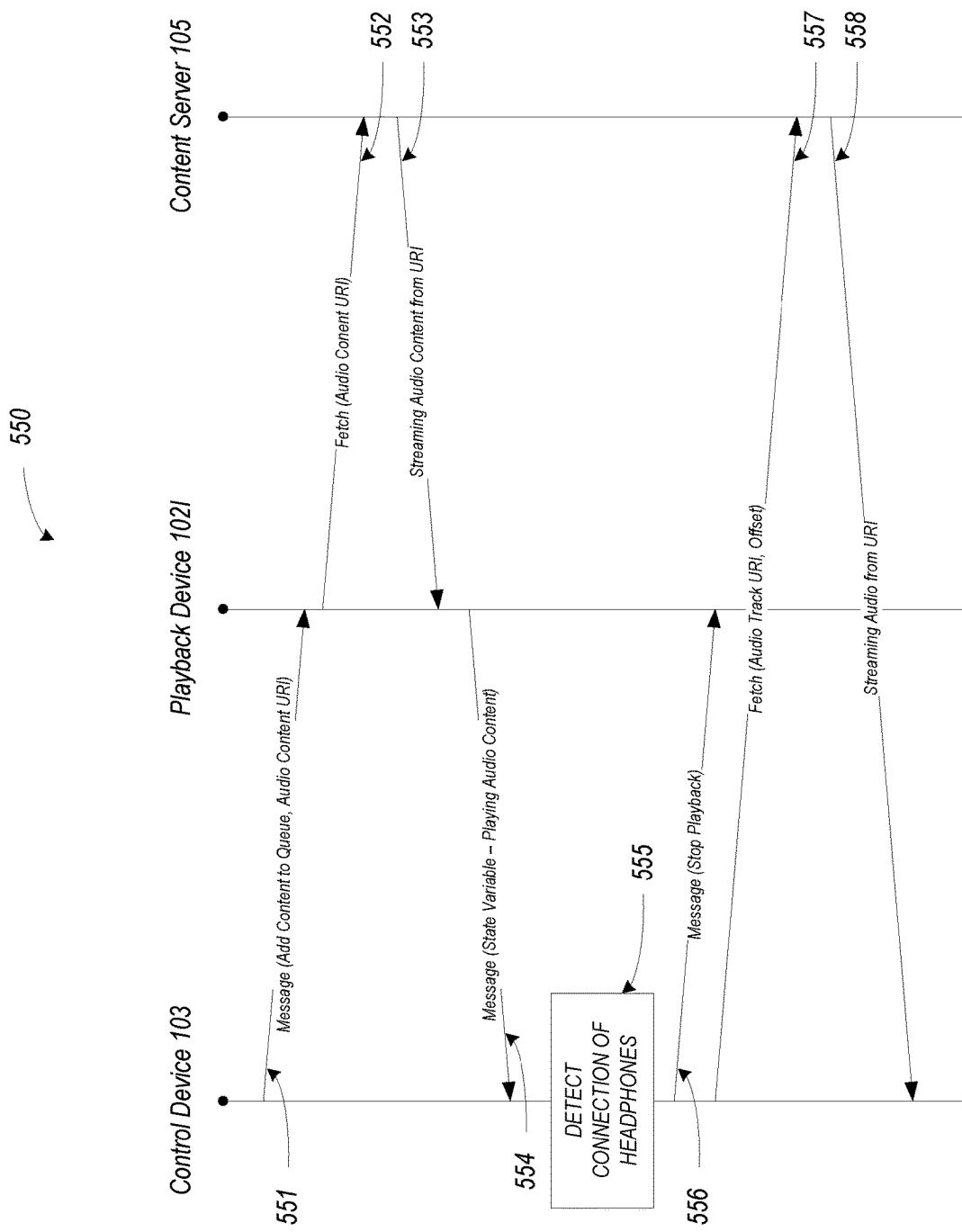
FIG. 5B is an example message flow diagram in accordance with aspects of the disclosure.

To illustrate example headphone interactions, FIG. 5B is a message flow diagram 550 showing instructions exchanged between the control device 103, the playback device 102*l*, and the remote computing devices 105 (i.e., a content server of a streaming audio service). Such messages are representative and example implementations that use additional or fewer messages are contemplated.

At 551, the control device 103 sends a message to the playback device 102*l* that instructs the playback device 102*l* to add particular audio content to the queue of playback device 102*l* for playback. The message includes a URI indicating the location of the audio content at the remote computing devices 105. The message also instructs the playback device 102*l* to play back the queue. In other examples, separate messages may instruct the playback device 102*l* to add the audio content to the queue and to play back the queue.

In an example, the control device 103 may send such a message based on receiving user input indicating an instruction to play back audio content on playback device 102*l*. For instance, via user interface 326, one or more audio tracks, Internet radio stations, or other audio content is selected for playback on playback device 102*l*, which as shown in FIG. 1 is configured as the Dining Room zone (which can also be referred to as the Dining Room "Room"). Such user input may involve a selection of the Dining Room zone (or perhaps a selection of a zone group that includes the Office zone) and selection of audio content to add to a queue of the Office zone (or of the zone group that includes the Office Zone). For instance, as shown in FIG. 4B, the user may select the "Dining Room+Kitchen" zone group in the playback zone region 443 of user interface 326b. In further examples, the input may involve selection of a Set, Room, Area, or Home of the Home Graph hierarchy described above.

Based on receiving the message instructing the playback device 102l to add an audio content to the queue of playback device 102l for playback, at 552, the playback device 102l sends a fetch message to the remote computing devices 105 requesting the audio content at the URI. Based on this fetch message, at 553, the remote computing devices 105 stream the audio content to the playback device 102l. The playback device 102l receives the audio content stream and plays back the audio content. At 554, the playback device 102l provides its status back to the control device 103 via a state variable indicating that the playback device 102l is playing back the audio content.

In an example in which playback device 102l is joined into a zone group (e.g., the "Dining Room+Kitchen" zone group), the playback device 102l and other playback devices of the zone group (e.g., the playback device 102i of the Kitchen zone), play back the audio content in synchrony. In such an example, the playback device 102l may operate as a zone group coordinator for the zone group by distributing the audio content stream and timing information to the other playback devices in the zone group via the network provided by network router 106 to facilitate synchronous playback, as described in previously referenced U.S. Pat. No. 8,234,395.

While the playback device 102l is playing back the audio content, at 555, the control device 103 detects connection of the headphones 104 to the control device 103. As described above in connection with FIG. 3, the control device 103 includes headphone interface(s) 336 to facilitate connection of the headphones 104 to the control device 103. Detecting connection of the headphones 104 may involve detecting a change in status of a state variable that is maintained by the headphone interface(s) 336, which indicates whether any headphones 104 are connected to the control device 103 via headphone interface(s) 336.

Based on detecting connection of the headphones 104 to the control device 103, the control device 103 transitions playback of the audio content from the playback device 102l to the control device 103. More particularly, the control device stops playback on the playback device 102l at a given play position and starts playback of the audio content on the control device 103 at the same play position. These operations effectively transition playback of the audio content from the playback device 102l to the control device 103.

To stop playback on the playback device 102, at 556, the control device 103 sends a message that instructs the playback device 102l to stop playback. In some examples, this message instructs the playback device to mute the audio content playback, which effectively stops playback from the perspective of the user. Muting the audio content playback (rather than stopping it completely) may facilitate transitioning playback back to the playback device 102l as the playback merely needs to be unmuted. However, such an implementation may use additional network resources (from streaming the audio content) and prevent the playback device 102l from going into certain low-power modes. As such, in alternate examples, the message instructs the playback device 102l to stop playback.

If playback device 102l is configured into a bonded zone, zone group, or other synchrony group, the control device 103 stops playback on all the playback devices in the synchrony group. In one example, the control device 103 sends the message that instructs the playback device 102l to stop playback to playback device 102l and, based on this message, playback device 102l instructs the other playback device(s) of the synchrony group to stop playback. Alternatively, the control device 103 sends messages to the playback devices of the synchrony group to instruct the playback devices to stop playback.

In some examples, the control device 103 receives an offset indicating a current play position of the audio content. The control device 103 may receive this offset based on the message instructing the playback device 102l to stop playback or a message requesting the offset, among other examples. In other examples, the play position is tracked by the control device 103 so as to facilitate showing an indication of play position on the control interface 326. In such examples, the playback device 102l may share the play position with the control device 103 as a state variable to facilitate accuracy of the play position indicator and to facilitate the example headphone interactions disclosed herein.

To start playback on the control device 103, at 557, the control device 103 sends a fetch message to the remote content servers 105 requesting the audio content at the URI. The fetch message may include an offset indicating the current play position of the audio content so as to instruct the remote content servers 105 to stream the audio content beginning with that play position. Based on this fetch message, at 558, the remote computing devices 105 stream the audio content to the control device 103. The control device 103 receives the audio content stream and plays back the audio content via the headphones 104.

In another example, the headphones 104 may already be connected to the control device 103 when the control device 103 receives an instruction to play audio content on a given playback device, bonded zone, zone group, or Home Graph hierarchy target (e.g., a Room or Area). In such examples, the control device 103 might not perform the steps at 551-544. Instead, the process may begin with performing the detect connection of headphones step shown at 555 and based on detecting that the headphones are connected, the control device 103 sends a fetch message to the remote content servers 105 requesting the audio content at the URI. Based on this fetch message, the remote computing devices 105 stream the audio content to the control device 103. The control device 103 receives the audio content stream and plays back the audio content via the headphones 104.

In some implementations, certain types of playback devices 102 are headphone-enabled. Before transitioning playback from a given playback device 102 to headphones 104 connected to the control device 103, the control device 103 may determine whether the given playback device 102 is headphone-enabled. Determining whether the given playback device 102 is headphone-enabled may involve checking a state variable maintained within the media playback system 100 that indicates whether given playback device 102 is headphone-enabled. In such implementations, if the given playback device 102 is headphone enabled, the control device 103 proceeds with transitioning playback. If not, the control device 103 does not transition playback.

Designating certain types of devices as headphone-enabled (or headphone-disabled) may prevent unexpected behavior in a multi-zone multi-controller system such as media playback system 100. Video-associated playback devices (i.e., playback devices, such as soundbar-type devices that are configured to play back audio in synchrony with video playing on a television) are an example type or category of playback devices that can be designated as headphone-enabled (or disabled) in various implementations. Grouped playback devices (e.g. playback devices 102 in a zone group or Area) are another example type or category of playback devices that can be designated as headphone-enabled (or disabled) in various implementations. Other examples are possible as well.

In some implementations, a given playback device 102 (or a given zone group, Area, or other group) becomes headphone-disabled when a first control device 103 has transitioned playback from the given playback device 102 to playback on the first control device 103 with headphones 104. This configuration prevents a second control device 103 from transitioning playback from the given playback device 102 to playback on the second control device 103, effectively limiting the feature to one set of headphones 104. Such a configuration may prevent unexpected behavior in a multi-zone multi-controller system such as media playback system 100.

Figure 5C:
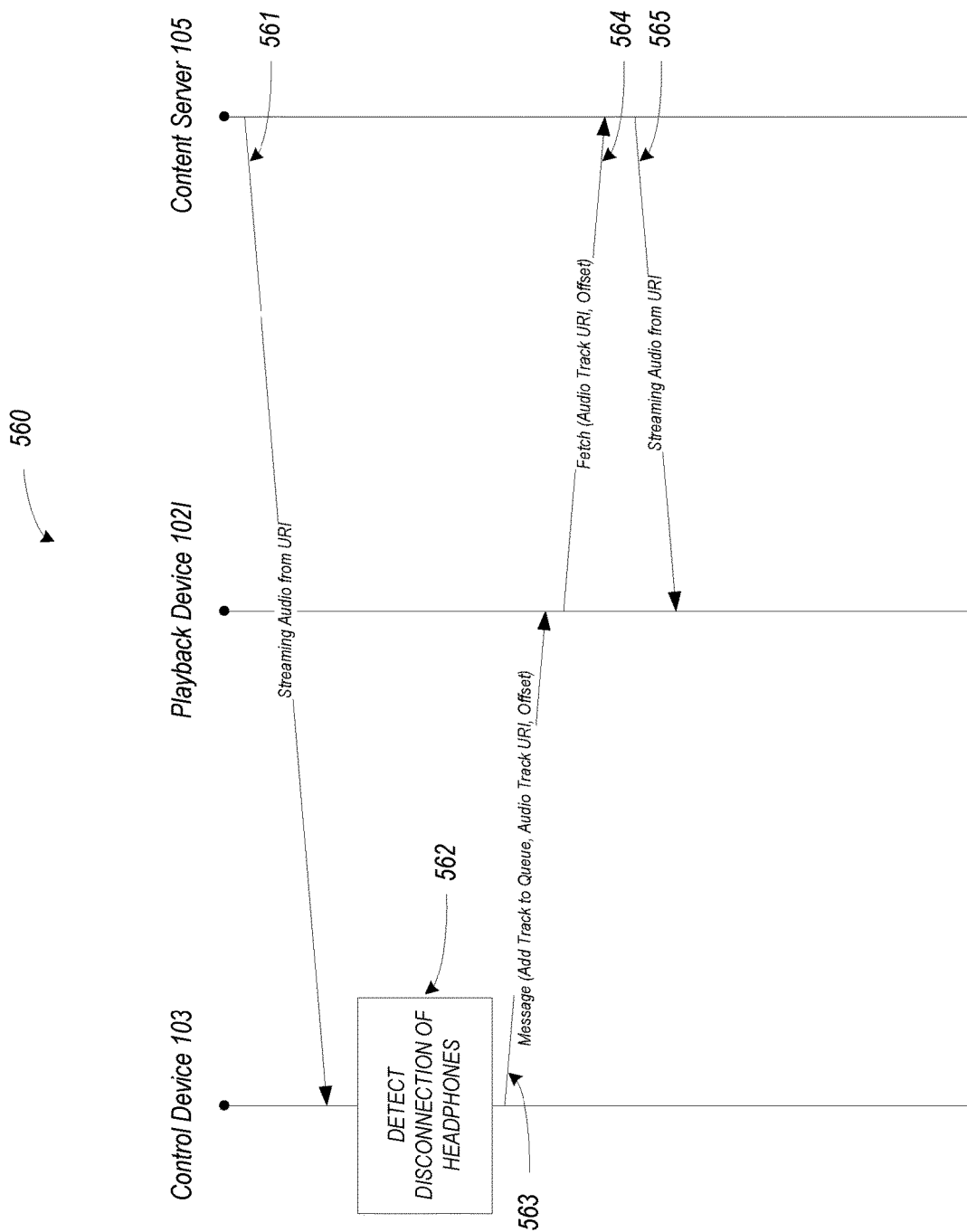
FIG. 5C is another example message flow diagram in accordance with aspects of the disclosure.

To illustrate a further example, FIG. 5C is a message flow diagram 560 showing instructions exchanged between the control device 103, the playback device 102*l*, and the remote computing devices 105 (i.e., a content server of a streaming audio service) to transition playback back from the control device 103 to the playback device 102*l*. Such messages are representative and example implementations that use additional or fewer messages are contemplated.

At 561, the remote computing devices 105 are streaming audio content to the control device 103, which plays the audio content back via headphones 104. Such a step is akin to the streaming performed at step 558 of FIG. 5B based on the fetch request at 557 to facilitate transferring playback from the playback device 102*l* to the control device 103. Alternatively, the control device 103 may send a fetch request based on audio content being selected for playback on the control device 103.

While the control device 103 is playing back the audio content via headphones 104, at 562, the control device 103 detects disconnection of the headphones 104 from the control device 103. As described above in connection with FIG. 3, the control device 103 includes headphone interface(s) 336 to facilitate connection of the headphones 104 to the control device 103. Detecting disconnection of the headphones 104 may involve detecting a change in status of a state variable that is maintained by the headphone interface(s) 336, which indicates whether any headphones 104 are connected to the control device 103 via headphone interface(s) 336.

Based on detecting disconnection of the headphones 104 from the control device 103, the control device 103 transitions playback of the audio content from the control device 103 to the playback device 102*l*. More particularly, the control device stops playback on the control device 103 at a given play position and starts playback of the audio content on the playback device 102*l* at the same play position. These operations effectively transition playback of the audio content from the control device 103 to the playback device 102*l*.

At 563, the control device 103 sends a message to the playback device 102*l* that instructs the playback device 102*l* to add particular audio content to the queue of playback device 102*l* for playback. The message includes a URI indicating the location of the audio content at the remote computing devices 105. The message also instructs the playback device 102*l* to play back the queue. In other examples, separate messages may instruct the playback device 102*l* to add the audio content to the queue and to play back the queue. In some examples, the message includes an offset indicating a current play position of the audio content.

Based on receiving the message instructing the playback device 102*l* to add an audio content to the queue of playback device 102*l* for playback, at 552, the playback device 102*l* sends a fetch message to the remote computing devices 105 requesting the audio content at the URI. Based on this fetch message, at 553, the remote computing devices 105 stream the audio content to the playback device 102*l*. The playback device 102*l* receives the audio content stream and plays back the audio content.

Alternatively, if playback by playback device 102*l* was stopped via muting, the message may instruct the playback device 102*l* to unmute the playback, which, in combination with stopping playback on the control device 103 with the headphones 104, effectively transitions playback back to the playback device 102*l*. In such examples, the fetch message from the playback device 102*l* is unnecessary, as the playback device 102*l* is already streaming the audio content.

In some implementations, when the control device 103 detects that the headphones 104 are disconnected (or otherwise disabled), the control device 103 verifies that the user has indicated that playback should be transitioned in such circumstances. For instance, the control device 103 may display a selectable control prompting the user to confirm that playback should resume on the playback device 102*l*. When the selectable control is selected, the control device 103 transitions playback to the playback device 102*l*. Alternatively, verification may be pre-set in advance using a policy.

Figure 6A:
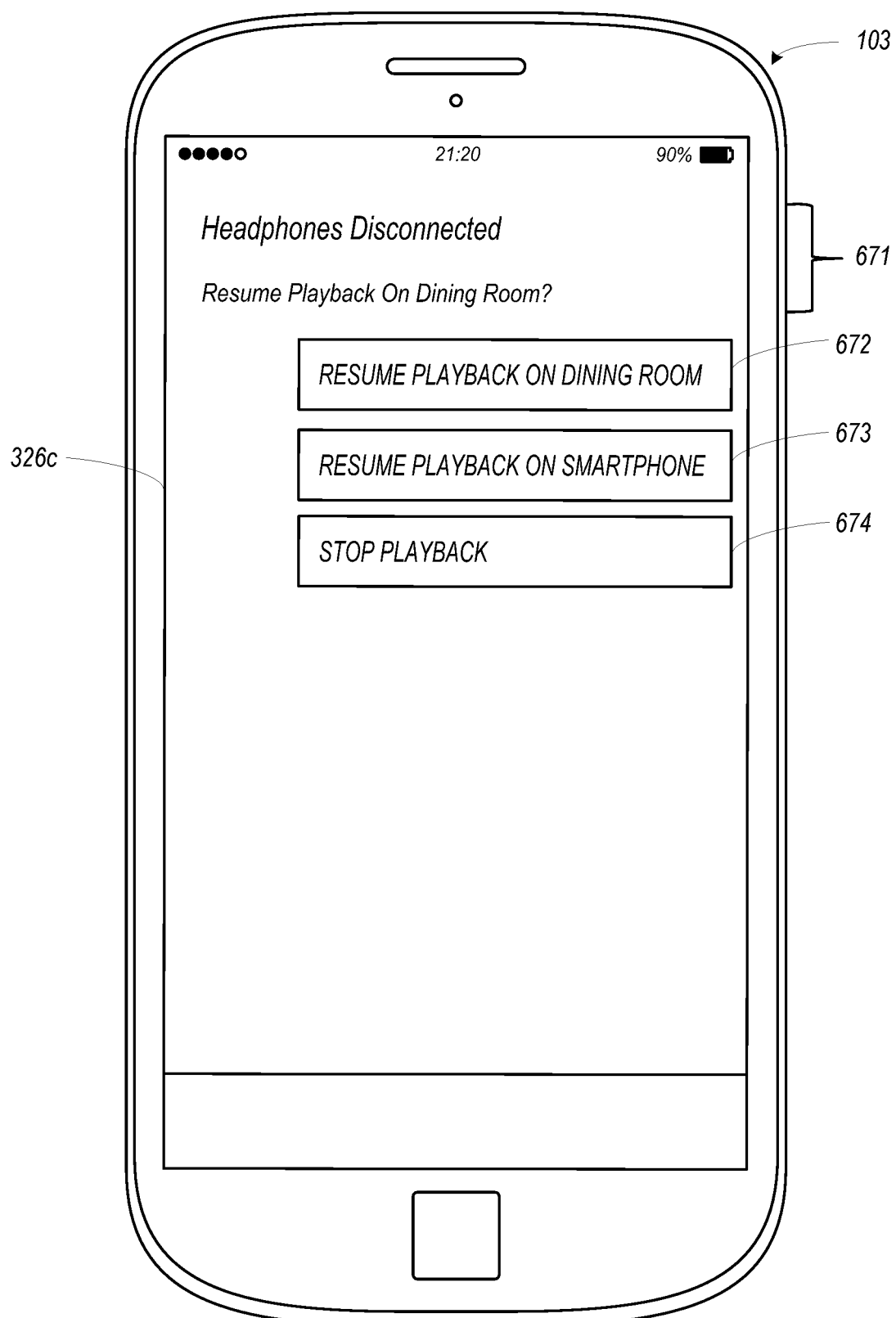
FIGS. 6A and 6B are an example user interfaces in accordance with aspects of the disclosure.

To illustrate such a prompt, FIG. 6A shows a controller interface 326*c* displayed on control device 103. As shown, controller interface 326*c* includes a prompt 671 indicating the control device 103 detected that the headphones 104 were disconnected from the control device 103. Controller interface 326*c* also includes a selectable control 672 that, when selected, causes the control device 103 to transition playback to playback device 102*l* (in the Dining Room zone). Alternatively, selectable controls 673 and 674 cause the control device 103 to continue playing back the audio content on the control device 103 (e.g., via integrated speakers) or to stop playback entirely, respectively. As indicated above, the controller interface 326*c* may additionally display selectable controls to optionally adjust a playback volume when playback resumes on playback device 102*l*.

Figure 6B:
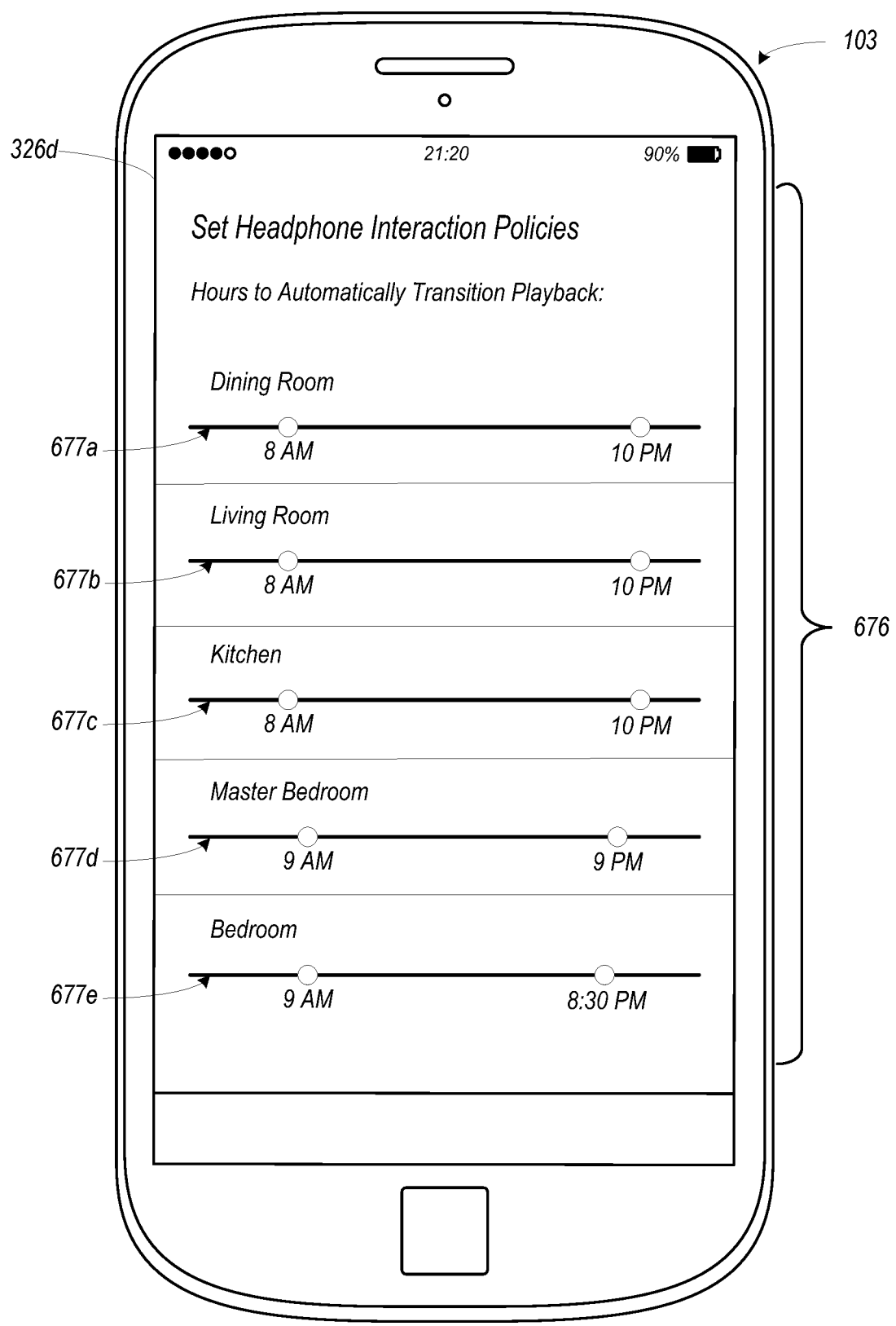

To illustrate example policies, FIG. 6B shows a controller interface 326*d* displayed on control device 103. As shown, controller interface 326*d* includes a policy region 676 that includes slider controls 677*a-e*. Each slider control 677*a-e* allows setting of a policy for a respective zone. In particular, each slider control 677*a-e* is controllable via touch input to set the hours (i.e., portions of a 24 hour cycle) for automatically transitioning playback for a respective zone, as shown. Additional slider controls (e.g., for other zones of a media playback system) may be accessed by scrolling the policy region 676. While zones are shown by way of example, polices may be set for various groupings, such as zone groups or Areas as well.

Figure 7A:
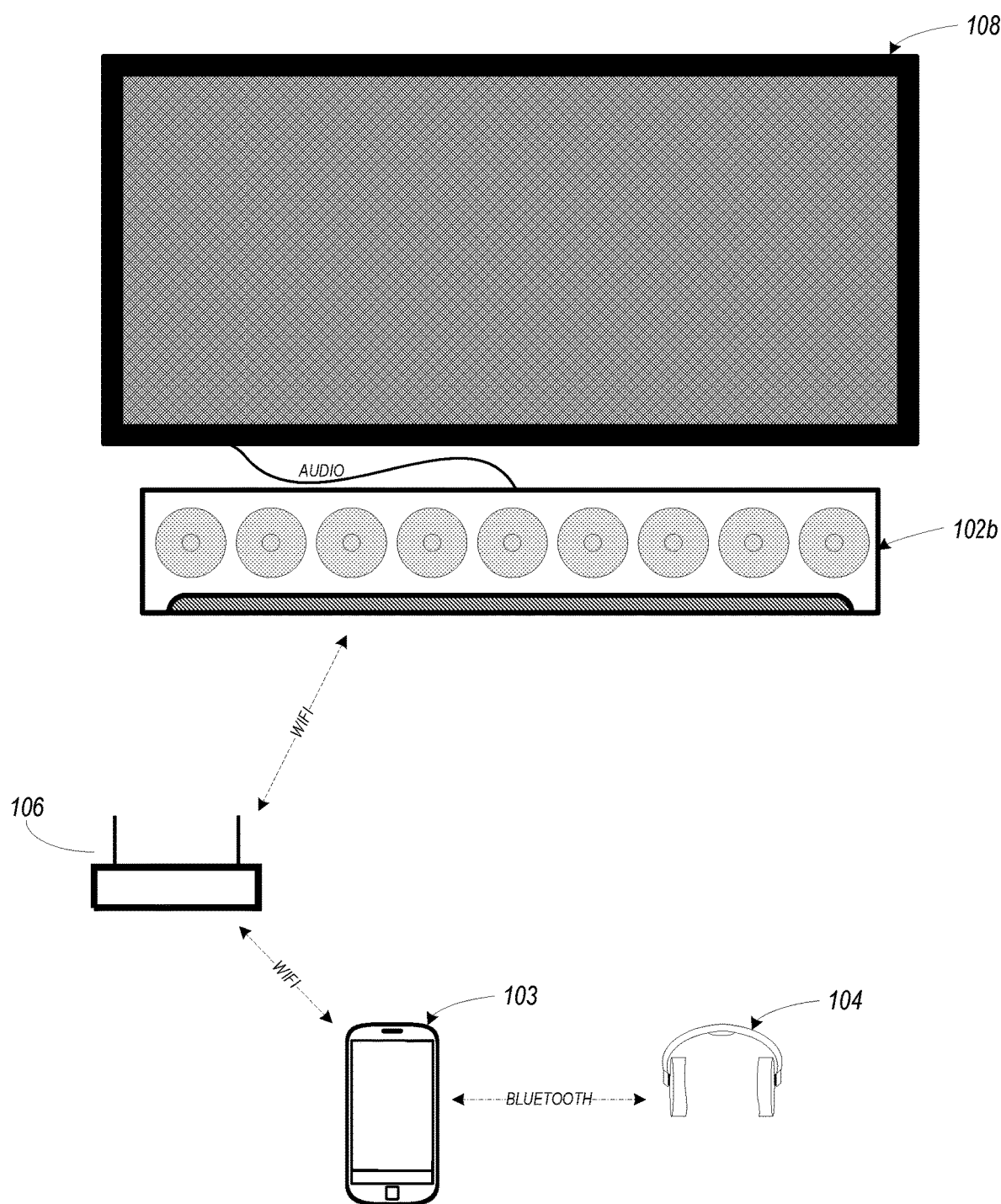
FIG. 7A shows an example system that illustrates example headphone interactions accordance with aspects of the disclosure.

Turning to another example, FIG. 7A illustrates another example configuration of a system in which example headphone interactions may be practiced. As shown, the system of FIG. 7A includes the playback device 102*b* of media playback system 100 (i.e., a soundbar-type device), the control device 103, headphones 104, and a network router 106. In operation, connection of the headphones 104 to the control device 103 causes the control device 103 to transition playback of audio content from the playback device 102b to the control device 103 (via the headphones 104). Similarly, disconnection of the headphones 104 from the control device 103 causes the control device 103 to transition playback of audio content from the control device 103 (via the headphones 104) to the playback device 102l.

In an example, playback device 102b is configured to receive audio content from television 780 and play back that audio content in synchrony with video playing on the television 780 (i.e., to play back the television audio). In such a configuration, when playback is transitioned from the playback device 102b to the control device 103 (via the headphones 104), playback device 102b may provide the audio content to the control device 103. Moreover, to keep the audio content playback in synchrony with the video content playing on the television 108, playback device 102b and control device 103 form a synchrony group in which playback device 102b provides audio content and timing information to control device 102b.

To illustrate, FIG. 7B is a message flow diagram 780 showing instructions exchanged between the control device 103 and the playback device 102b. Such messages are representative and example implementations that use additional or fewer messages are contemplated.

At 781, the control device 103 sends a message to the playback device 102b that instructs the playback device 102b to play back the line-in input (e.g., an HDMI, optical digital or analog input). Based on this instruction, the playback device 102b begins playing audio content provided via the line-in connection. At 782, the playback device 102b provides its status back to the control device 103 via a state variable indicating that the playback device 102l is playing back audio content from the line-in connection.

While the playback device 102b is playing back the audio content, at 783, the control device 103 detects connection of the headphones 104 to the control device 103. As described above in connection with FIG. 3, the control device 103 includes headphone interface(s) 336 to facilitate connection of the headphones 104 to the control device 103. Detecting connection of the headphones 104 may involve detecting a change in status of a state variable that is maintained by the headphone interface(s) 336, which indicates whether any headphones 104 are connected to the control device 103 via headphone interface(s) 336.

Based on detecting connection of the headphones 104 to the control device 103, the control device 103 transitions playback of the audio content from the playback device 102b to the control device 103. More particularly, the control device stops playback on the playback device 102b and starts playback of the audio content on the control device 103. These operations effectively transition playback of the audio content from the playback device 102b to the control device 103.

To stop playback on the playback device 102b, at 784, the control device 103 sends a message that instructs the playback device 102b to mute playback. If playback device 102b is configured into a bonded zone, zone group, or other synchrony group, all the playback devices in the synchrony group mute playback as well. For instance, if playback device 102b is configured into a bonded zone (i.e., a surround sound configuration) with playback devices 102a, 102j, and 102k, the message mutes playback on each device in the bonded zone configuration. In one example, the control device 103 sends the message that instructs the playback device 102b to mute playback to playback device 102b and, based on this message, the playback device 102b instructs the other playback device(s) of the synchrony group to mute playback. Alternatively, the control device 103 sends messages to the playback devices of the synchrony group to instruct the playback devices to mute playback.

To start playback on the control device 103, at 785, the control device 103 sends a message that instructs the playback device 102b to form a synchrony group with the control device 103. Based on this message, the playback device 102b forms a synchrony group with the control device 103. In some examples, the playback device 102b becomes a group coordinator of the new synchrony group. As group coordinator, the playback device 102b provides audio content and timing information to the control device 103, as described in previously referenced U.S. Pat. No. 8,234,395. At 786, the playback device 102b streams this audio content and timing information to the control device 103.

In this example, the control device 103 and the playback device 102b are playing back the audio content from the television 108 in synchrony. However, playback has effectively transitioned from the playback device 102b to the control device 103 since playback on the playback device 102b is muted and the control device 103 is now playing back the audio content from the television 108 via the headphones 104.

If the playback device 102b was previously in another group, the message at 785 to create a synchrony group may affect this group. In some instances, such as when the group is a synchrony group in which each device plays back the same audio content, the message at 785 causes the the control device 103 to join the existing group. In other instances, such as when the group is a bonded zone in which each device plays back the different audio content (e.g., different channels of the audio content), the message at 785 causes formation of a new synchrony group that includes the playback device 102b and the control device 103.

During playback on the control device 103, control inputs received via the control interface 326 may be applied to the synchrony group. Some of these inputs (e.g., volume control) may be only applied to the control device, while others are applied to all devices in the synchrony group (e.g., transport) control. That is, volume control is not reflected on the playback device(s) 102 so that the volume levels of the playback devices 102 are maintained from their pre-muted level. However, transport controls are applied to keep playback in synchrony.

To illustrate a further example, FIG. 7C is a message flow diagram 790 showing instructions exchanged between the control device 103 and the playback device 102b to transition playback from the control device 103 to the playback device 102b. Such messages are representative and example implementations that use additional or fewer messages are contemplated.

At 791, the playback device 102b is streaming audio content and timing information to the control device 103 to facilitate playback of the audio content from the television 108 via headphones 104. This step is akin to the streaming performed at step 786 of FIG. 7B.

While the control device 103 is playing back the audio content via headphones 104, at 792, the control device 103 detects disconnection of the headphones 104 from the control device 103. Based on detecting disconnection of the headphones 104 from the control device 103, the control device 103 transitions playback of the audio content from the control device 103 to the playback device 102b. More particularly, the control device 103 stops playback on the control device 103 and starts playback of the audio content on the playback device 102b. These operations effectively transition playback of the audio content from the control device 103 to the playback device 102b.

At 793, the control device 103 sends a message to the playback device 102b that instructs the playback device 102b to dissolve the synchrony group that includes the control device 103. If the playback device 102b was previously part of another synchrony group prior to forming the synchrony group that includes the control device 103, the playback device 102b may re-form that synchrony group (perhaps by removing the control device 103). Alternatively, the playback device 102b may operate individually. Dissolving the synchrony group that includes the control device 103 stops play back on the control device 103 via the headphones 104, as this operation causes the playback device 102b to stop providing the audio content and timing information to the control device 103.

To start playback of the audio content on the playback device 102b, the control device 103 sends a message to the playback device 102b that instructs the playback device 102b to unmute playback. If playback device 102l is configured into a bonded zone, zone group, or other synchrony group, all the playback devices in the synchrony group unmute playback as well. For instance, if playback device 102b is re-configured into a bonded zone (i.e., a surround sound configuration) with playback devices 102a, 102j, and 102k, the message unmutes playback on each device in the bonded zone configuration.

In some implementations, when the control device 103 detects that the headphones 104 are disconnected (or otherwise disabled), the control device 103 verifies that the user has indicated that playback should be transitioned in such circumstances. For instance, the control device 103 may display a selectable control prompting the user to confirm that playback should resume on the playback device 102b. The control device 103 may additionally prompt the user to optionally adjust a playback volume when playback resumes on playback device 102b. Additionally or alternatively, verification may be pre-set in advance using a policy. Examples of such verification are shown in FIGS. 6A and 6B.

Figure 7D:
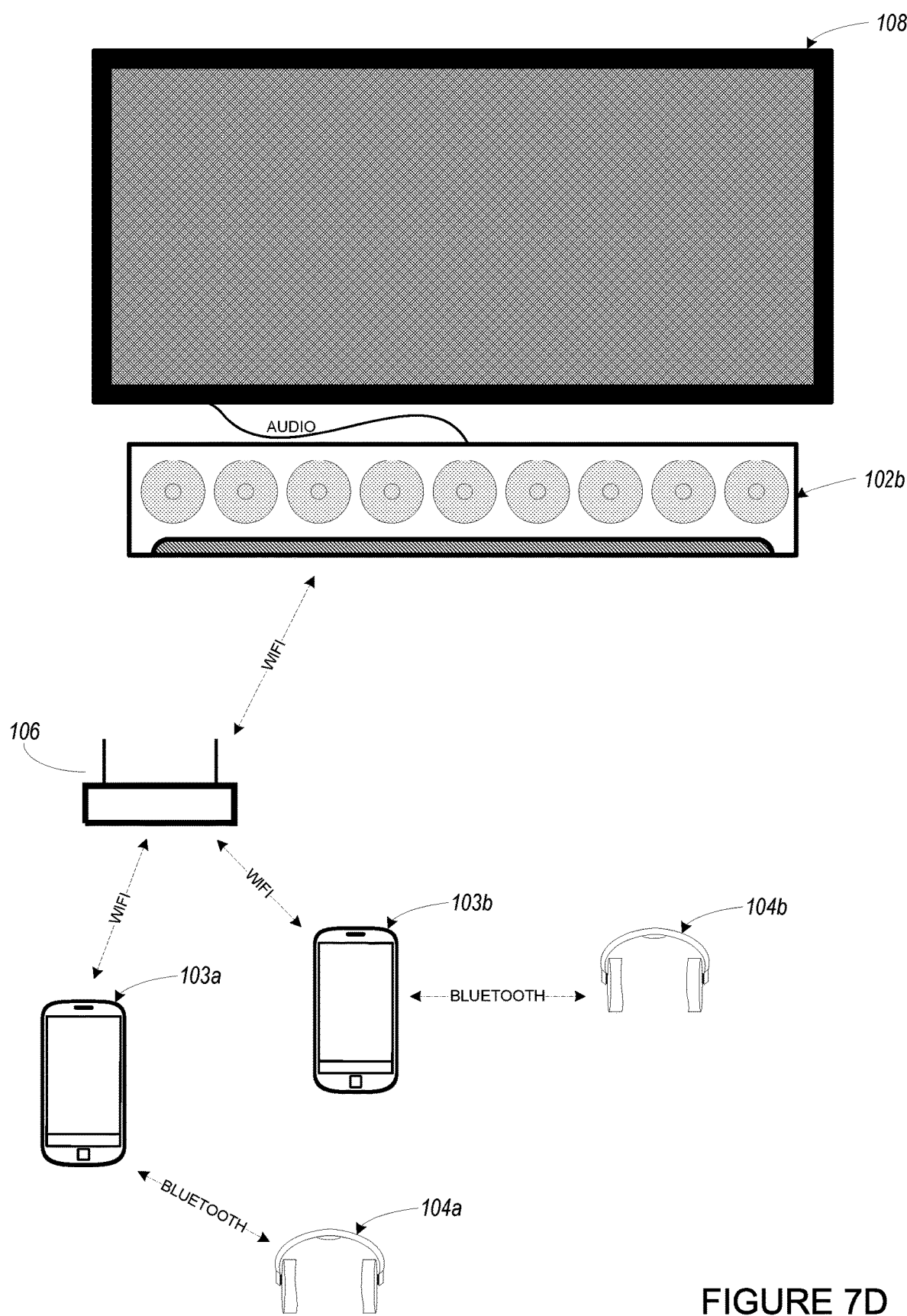
FIG. 7D shows an example system that illustrates example headphone interactions accordance with aspects of the disclosure.

In further examples, multiple control devices 103 are connectable to the playback device 102 for synchronous playback. FIG. 7D illustrates an example system with two control devices 103 connected to playback device 102b. Each additional control device 103 is included in the synchrony group that includes the playback device 102 and the first control device. For instance, in FIG. 7D, the playback device 102b providing audio content and timing information to control devices 103a and 103b as group coordinator of a synchrony group.

In a multiple control device configuration such as FIG. 7D, the first control device 103 to detect that headphones are connected may trigger the headphone interaction. For instance, the control device 103a may detect that headphones 104a were connected to control device 103a and transition playback to control device 103a via headphones 104a. Subsequently, the control device 103b may detect that headphones 104b were connected to control device 103b and transition playback to control device 103b via headphones 104b (e.g., by joining the synchrony group that includes playback device 102b and control device 103a).

At some point thereafter, headphones may be disconnected from one of the control devices. For instance, the control device 103a may detect that headphones 104a were disconnected from control device 103a. Based on this detection, the control device 103a may leave the synchrony group. However, playback of the audio content from the television 108 continues on to control device 103b via headphones 104b until control device 103b detects that headphones 104b were disconnected from control device 103b. At this point, both control devices 103 leave the synchrony group and audio content playback on playback device 102b is unmuted.

In some examples, playback devices 102 in proximity to a control device 103 may have their audio playback modified when the control device 103 detects that headphones 104 have been connected or disconnected from the control device 103. Techniques for determining the location or proximity of a control device relative to a playback device may include or more techniques disclosed in U.S. Pat. No. 9,084,058 filed Dec. 29, 2011, and titled "Sound Field Calibration Using Listener Localization," which is incorporated herein in its entirety. In addition, techniques for determining the location or proximity of a control device relative to a playback device may include or more techniques disclosed in U.S. Pat. No. 8,965,033 filed Aug. 31, 2012, and titled "Acoustic Optimization" is incorporated herein by reference in its entirety.

IV. Example Headphone Interaction Techniques

Figure 8:
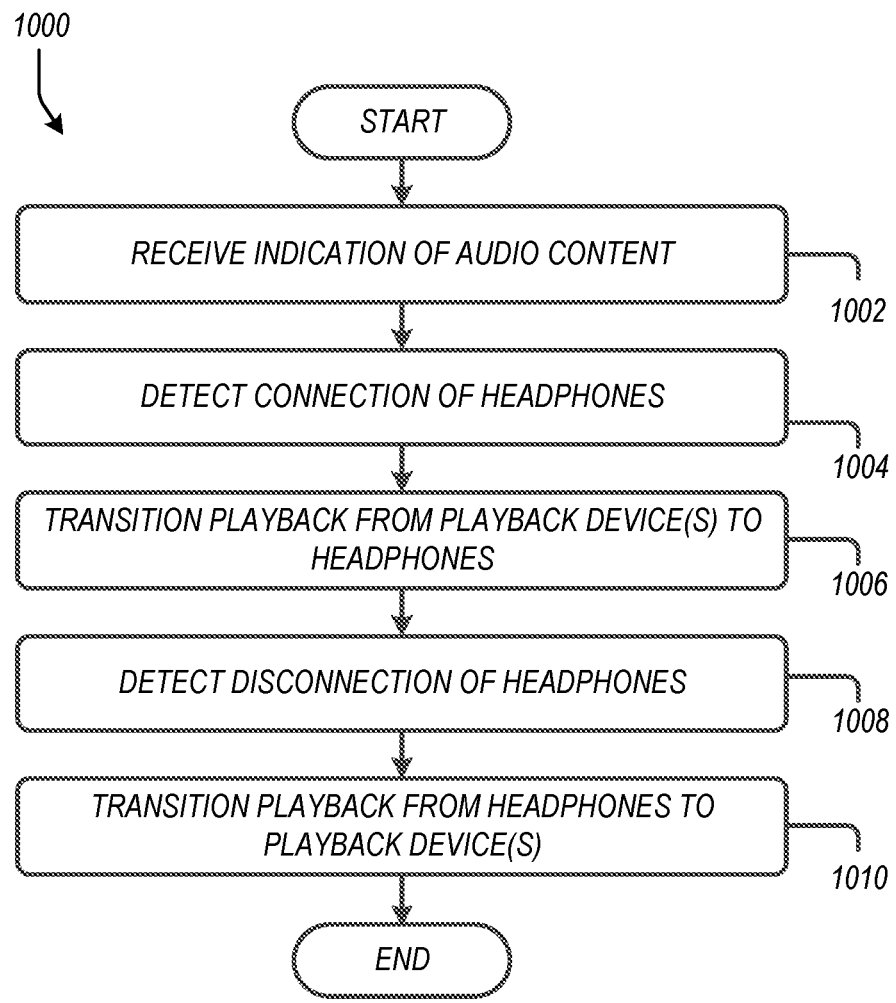
FIG. 8 shows an example headphone interaction technique, according to example implementations.

Implementation 1000 shown in FIG. 8 presents example embodiments of techniques described herein. These example embodiments that can be implemented within an operating environment including, for example, the media playback system 100 of FIG. 1, one or more of the playback device 102 of FIG. 2, and one or more of the control device 103 of FIG. 3, as well as other devices described herein and/or other suitable devices. Further, operations illustrated by way of example as being performed by a media playback system can be performed by any suitable device, such as a playback device or a control device of a media playback system. Implementation 1000 may include one or more operations, functions, or actions as illustrated by one or more of blocks shown in FIG. 8. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

As discussed above, embodiments described herein involve headphone interactions with a media playback system. FIG. 8 illustrates an example implementation 1000 by which connection and/or disconnection of headphones 104 to a control device 103 of a media playback system 100 may trigger interactions with the media playbacks system 100.

a. Receive Indication of Audio Content

At block 1002, implementation 1000 involves receiving an indication of audio content. In some examples, the control device 103 may receive an indication of audio content may include an indication of audio content that is currently playing on one or more playback devices 102. Alternatively, the playback device 102 may receive an instruction to play audio content on one or more playback devices 102, among other examples.

For instance, the control device 103 may receive via a network interface, an indication of particular audio content being played back by a first zone of the media playback system. Examples of such indications include the messages indicating state variables at 554 in FIG. 5B and at 782 in FIG. 7B. In some instances, the control device 103 may receive such an indication while headphones are disconnected from the first control device.

As a further example, the playback device 102 may receive, from a control device 103, an instruction to play audio content on one or more playback devices 102. For instance, as shown in FIG. 5B at 551, the control device 103 may send a message instructing the playback device 102 to play back particular audio content from an audio content URI. Based on such an instruction, the playback device 102 retrieves the audio content from an audio source and plays back the retrieved audio content.

b. Detect Connection of Headphones

At block 1004, implementation 1000 involves detecting connection of headphones. For instance, the control device 103 may detect connection of headphones to control device 103, as discussed at 555 in FIG. 5B and at 783 in FIG. 7B. As discussed above, detecting connection of headphones may involve detecting a change in the state of a state variable indicating headphone connection status. Headphones may be connectable to the control device 103 via either an analog headphone jack or a point-to-point personal area network connection via a personal area network interface, among other examples.

In another example, detecting connection of headphones involves receiving a message indicating that headphones 104 are connected to the control device 103 of the media playback system. For instance, the playback device 102 may receive such a message from the control device 103 via a network interface based on the control device 103 detecting connection of headphones 104. In some examples, the playback device 102 may receive such messages from multiple control devices 103 (e.g., from control device 103a and control device 103b as shown in FIG. 7D).

c. Transition Playback from Playback Device(s) to Headphones

In FIG. 10, at block 1006, implementation 1000 involves transitioning playback from one or more playback devices to headphones. For instance, the control device 103 may transition playback from the playback device(s) 102 to the control device 103 via headphones 104 based on detecting that the headphones are connected to the control device 103 In another example, a given playback device 102 may transition playback from the playback device(s) 102 to the control device 103 via headphones 104 based on detecting that the headphones are connected to the control device 103

As noted above, the control device 103 may transition playback. Transitioning playback may involve causing the playback device(s) 102 to stop playback of the particular audio content, as described in connection with steps 556 of FIG. 5B and 784 of FIG. 7B. Transitioning playback may also involve retrieving the audio content from an audio source and resuming playback of the particular audio content via the connected headphones, as illustrated by steps 557 and 558 of FIG. 5B and steps 785 and 786 of FIG. 7B.

In another example, the playback device 102 may transition playback. For instance, the playback device 102 may stop playback of the retrieved audio content (e.g., by muting playback or stopping playback entirely). The playback device 102 may cause the control device 103 to play back the audio content via the connected headphones, perhaps by sending the audio content and timing information to the control device 103, as illustrated in step 786 of FIG. 5B.

d. Detect Disconnection of Headphones

Referring again to FIG. 10, at block 1008, implementation 1000 involves detecting disconnection of headphones. For instance, the control device 103 may detect disconnection of headphones from control device 103, as discussed at 562 in FIG. 5C and at 792 in FIG. 7C. As discussed above, detecting disconnection of headphones may involve detecting a change in the state of a state variable indicating headphone connection status.

In another example, detecting disconnection of headphones involves receiving a message indicating that headphones 104 have been disconnected from connected to the control device 103. For instance, the playback device 102 may receive such a message from the control device 103 via a network interface. In some examples, the playback device 102 may receive such messages from multiple control devices 103 (e.g., from control device 103a and control device 103b as shown in FIG. 7D).

e. Transition Playback from Headphones to Playback Device(s)

In FIG. 10, at block 1010, implementation 1000 involves transitioning playback from headphones to one or more playback devices. For instance, the control device 103 may transition playback from the control device 103 via headphones 104 to the playback device(s) 102 based on detecting that the headphones are disconnected from the control device 103. In another example, a given playback device 102 may transition playback from the control device 103 via headphones 104 to the playback device(s) 102 based on detecting that the headphones are connected to the control device 103

As noted above, the control device 103 may transition playback. Transitioning playback may involve to stopping playback of the particular audio content, as described in connection with step 793 of FIG. 7C. Transitioning playback may also involve causing the playback device(s) 102 to resume playback of the audio content, as illustrated by step 563 of FIG. 5C and step 794 of FIG. 7C.

In another example, the playback device 102 may transition playback. For instance, the playback device 102 may cause the control device 103 to stop playback (e.g., by ceasing to provide the audio content and/or timing information to the control device 103). The playback device 102 may start playback by retrieving the audio content or unmuting playback, among other examples.

V. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising while headphones are disconnected from the first control device, receiving, via a network interface of the first control device, an indication of particular audio content being played back by a first zone of the media playback system, wherein the first zone comprises one or more playback devices that are separate and distinct from the first control device and connected to the first control device via a local area network; while the particular audio content is being played back by the one or more playback devices of the media playback system, detecting that headphones have been connected to the first control device, wherein headphones are connectable to the first control device via either (a) an analog headphone jack of the first control device or (b) a point-to-point personal area network connection via a personal area network interface of the first control device; and in response to detecting that the headphones are connected to the first control device of the media playback system: (i) causing, via the network interface of the first control device, the one or more playback devices of the first zone to stop playback of the particular audio content; (ii) retrieving, via the network interface of the first control device, the particular audio content from an audio source that is remote from the first control device; and (iii) resuming playback of the particular audio content via the connected headphones.

(Feature 2) The method of feature 1, further comprising: while the first control device is playing back the particular audio content via the connected headphones, detecting that the headphones have been disconnected from the first control device; in response to detecting that the headphones have been disconnected from the first control device, (i) stopping playback of the particular audio content by the first control device and (ii) causing a graphical display to display a selectable control, that when selected, causes one or more playback devices of the first zone to resume playback of the particular audio content; and in response to detecting input data indicating a selection of the selectable control, that when selected, causes the one or more playback devices of the first zone to resume playback of the particular audio content, causing, via the network interface of the first control device, the one or more playback devices of the first zone to resume playback of the particular audio content.

(Feature 3) The method of feature 1, further comprising: while the first control device is playing back the particular audio content via the connected headphones, detecting that the headphones have been disconnected from the first control device; in response to detecting that the headphones have been disconnected from the first control device, (i) stopping playback of the particular audio content by the first control device and (ii) determining whether a policy of the first zone indicates that playback is resumed when headphones have been disconnected from the first control device; and in response to determining that the policy of the first zone indicates that playback is resumed when headphones have been disconnected from the first control device, causing, via the network interface of the first control device, the one or more playback devices of the first zone to resume playback of the particular audio content.

(Feature 4) The method of feature 3, wherein the policy indicates that playback is resumed when headphones have been disconnected from the first control device during a portion of a 24 hour cycle and the policy indicates that playback is not resumed when headphones have been disconnected from the first control device during the remainder of the 24 hour cycle.

(Feature 5) The method of feature 1, wherein detecting that headphones have been connected to the first control device comprises detecting that a state variable stored in data storage of the first control device has been modified to indicate that headphones are connected to the first control device, wherein the state variable is updated by at least one of (a) a circuit within the analog headphone jack of the first control device or (b) the personal area network interface of the first control device.

(Feature 6) The method of feature 1, wherein retrieving the particular audio content from the audio source that is remote from the first control device comprises: joining the first control device as a second zone into a zone group that includes the first zone; and receiving, via the network interface of the first control device from a zone group coordinator of the zone group, a data stream representing (i) the particular audio content for playback by the first control device via the headphones and (ii) playback timing information indicating a playback schedule for the first control device to play back the particular audio content via the connected headphones in synchrony with the one or more playback devices of the first zone, wherein the one or more playback devices are muted, and wherein the zone group coordinator is a given playback device of the first zone.

(Feature 7) The method of feature 1, wherein the first zone comprises a given playback device comprising a line-in interface, and wherein retrieving the particular audio content from the audio source that is remote from the first control device comprises receiving, via the network interface of the first control device from the given playback device, an audio stream representing the particular audio content received by the given playback device via the line-in interface.

(Feature 8) The method of feature 7, wherein the particular audio content is an audio track of video content, wherein the line-in interface of the given playback device is connected to a television, and wherein retrieving the particular audio content from the audio source that is remote from the first control device comprises receiving, via the network interface of the first control device from the given playback device, the audio stream representing the particular audio content for playback by the first control device via the connected headphones in sync with video content playing on the television.

(Feature 9) The method of feature 1, wherein the first zone comprises multiple playback devices, and wherein causing the one or more playback devices of the first zone to stop playback of the particular audio content comprises sending, via the network interface of the first control device to a group coordinator of the first zone, an instruction to cause the group coordinator of the first zone to stop synchronous playback of the particular audio content among the multiple playback devices of the first zone, wherein the group coordinator is a given playback device of the first zone that provides, to other playback devices of the first zone, a data stream representing (i) the particular audio content and (ii) playback timing information indicating a playback schedule for the multiple playback devices to play back the particular audio content in synchrony.

(Feature 10) The method of feature 1, wherein the first zone is in a zone group with a second zone that comprises one or more additional playback devices, and wherein causing the one or more playback devices of the first zone to stop playback of the particular audio content comprises sending, via the network interface of the first control device to the first zone and the second zone, respective instructions to stop synchronous playback of the particular audio content.

(Feature 11) A tangible, non-transitory computer-readable medium having stored therein instructions executable by one or more processors to cause a device to perform the method of any of features 1-10.

(Feature 12) A control device configured to perform the method of any of features 1-10.

(Feature 13) A system configured to perform the method of any of features 1-10.

(Feature 14) A method to be carried out by a playback device comprising an audio stage comprising an amplifier, one or more speakers, an I/O interface comprising a network interface, one or more processors, a housing carrying the audio stage, the one or more speakers, the network interface, the one or more processors and data storage having stored therein instructions executable by the one or more processors to cause the playback device to perform the method, the methods comprising: receiving, via the network interface from a first control device of the media playback system, an instruction to play back audio content, wherein the first control device is separate and distinct from the playback device; in response to receiving the instruction to play back audio content, (i) retrieving, via the I/O interface, the audio content from an audio source that is remote from the playback device and (ii) playing back the retrieved audio content via the audio stage and the one or more speakers; while playing back the retrieved audio content via the audio stage and the one or more speakers, receiving, via the network interface from the first control device, a message indicating that first headphones are connected to the first control device of the media playback system; and in response to receiving the message indicating that the first headphones are connected to the first control device of the media playback system: (i) stopping playback of the retrieved audio content via the audio stage and the one or more speakers and (ii) causing, via the network interface, the first control device to play back the audio content via the first headphones.

(Feature 15) The method of feature 14, further comprising: while the first control device is playing back the audio content via the first headphones, receiving, via the network interface from the first control device of the media playback system, a message indicating that that the first headphones are disconnected from the first control device of the media playback system; and in response to receiving the message indicating that the first headphones are disconnected from the first control device of the media playback system, starting playback of the retrieved audio content at a muted volume level via the audio stage and the one or more speakers at a play position corresponding to when the first headphones were disconnected from the first control device of the media playback system.

(Feature 16) The method of feature 14, further comprising: while the first control device is playing back the audio content via the first headphones, receiving, via the network interface from a second control device of the media playback system, a message indicating that second headphones are connected to the second control device of the media playback system, wherein the second control device is separate and distinct from the playback device and the first control device; and in response to receiving the message indicating that the second headphones are connected to the second control device of the media playback system, causing, via the network interface, the second control device to play back the audio content via the second headphones in synchrony with the first control device via the first headphones.

(Feature 17) The method of feature 16, further comprising: while the first control device and the second control device are playing back the audio content via the first headphones and the second headphones, respectively, receiving, via the network interface from the first control device of the media playback system, a message indicating that that the first headphones are disconnected from the first control device of the media playback system; and in response to receiving the message indicating that the first headphones are disconnected from the first control device of the media playback system, causing, via the network interface, the second control device to stop playing back the audio content via the second headphones.

(Feature 18) The method of feature 16, wherein causing the second control device to play back the audio content via the second headphones in synchrony with the first control device via the first headphones comprises: transmitting, via the network interface to the first control device, (i) the audio content for playback by the first control device via the first headphones and (ii) playback timing information indicating a playback schedule for the first control device to play back the audio content via the first headphones in synchrony with the second control device; and transmitting, via the network interface to the second control device, (i) the audio content for playback by the first control device via the first headphones and (ii) playback timing information indicating a playback schedule for the second control device to play back the audio content via the second headphones in synchrony with the first control device.

(Feature 19) The method of feature 14, wherein the I/O interface comprises a line-in interface, wherein retrieving, via the I/O interface, the audio content from an audio source that is remote from the playback device comprises receiving the audio content from via the line-in interface, and wherein causing, via the network interface, the first control device to play back the audio content via the first headphones comprises streaming, via the network interface, the audio content to the first control device for playback by the first control device via the first headphones.

(Feature 20) The method of feature 19, wherein the audio content is an audio track of video content, wherein the line-in interface is connected to a television, and wherein causing, via the network interface, the first control device to play back the audio content via the first headphones comprises streaming, via the network interface, the audio content to the first control device for playback by the first control device via the first headphones in sync with video content playing on the television.

(Feature 21) The method of feature 19, wherein streaming the audio content to the first control device for playback by the first control device via the first headphones comprises hosting the audio content in data storage of the playback device, and wherein causing, via the network interface, the first control device to play back the audio content via the first headphones comprises sending, via the network interface to the first control device, a uniform resource identifiers indicating a locations of the audio content at the playback device.

(Feature 22) The method of feature 14, wherein the audio content comprises one or more audio tracks of a streaming audio service, and wherein causing, via the network interface, the first control device to play back the audio content via the first headphones comprises sending, via the network interface to the first control device, one or more uniform resource identifiers indicating respective locations of the one or more audio tracks at one or more servers of a streaming audio service.

(Feature 23) The method of feature 14, wherein stopping playback of the retrieved audio content via the audio stage and the one or more speakers comprises muting playback of the retrieved audio content via the audio stage and the one or more speakers.

(Feature 24) A tangible, non-transitory computer-readable medium having stored therein instructions executable by one or more processors to cause a device to perform the method of any of features 14-23.

(Feature 25) A playback device configured to perform the method of any of features 14-23.

(Feature 26) A system configured to perform the method of any of features 14-23.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
a first device comprising an audio/video input interface, at least one first network interface, and a housing carrying the at least one first network interface and the audio/video input interface;
a second device comprising at least one second network interface, at least one audio transducer, and at least one wearable housing carrying the at least one second network interface and the at least one audio transducer;
at least one processor; and
at least one non-transitory computer-readable medium comprising program instructions that are executable by the at least one processor such that the system is configured to:
receive, via the audio/video input interface of the first device from a television, at least one input data stream comprising audio;
establish connection of the second device to the first device via a personal area network;
detect, via the second device, a particular set of one or more trigger conditions to transition playback of the audio to the second device;
in response to detection of the particular set of one or more trigger conditions, send, via the at least one first network interface over the personal area network, at least one audio signal representing the audio in the at least one input data stream;
receive, via the at least one second network interface over the personal area network, the at least one audio signal; and
play back the at least one audio signal via the at least one audio transducer.

2. The system of claim 1, wherein the particular set of one or more trigger conditions comprises establishment of the connection of the second device to the first device, and wherein the program instructions that are executable by the at least one processor such that the system is configured to detect the particular set of one or more trigger conditions comprise program instructions that are executable by the at least one processor such that the system is configured to:
detect that the connection of the second device to the first device via the personal area network has been established.

3. The system of claim 2, wherein the particular set of one or more trigger conditions comprises a user input to transition playback of the audio to the second device, and wherein the program instructions that are executable by the at least one processor such that the system is configured to detect the particular set of one or more trigger conditions comprise program instructions that are executable by the at least one processor such that the system is configured to:
receive, via the at least one second network interface, data indicating that the user input to transition playback of the audio to the second device was received via a mobile device.

4. The system of claim 1, wherein the at least one non-transitory computer-readable medium further comprises program instructions that are executable by the at least one processor such that the system is configured to:
receive, via the at least one second network interface from a mobile device, data representing instructions to adjust playback volume of the at least one audio signal; and
adjust volume that the at least one audio signal is played back via the at least one audio transducer.

5. The system of claim 1, wherein the at least one non-transitory computer-readable medium further comprises program instructions that are executable by the at least one processor such that the system is configured to:
when playback of the at least one audio signal begins, adjust a volume setting of the second device to a particular pre-selected volume level corresponding to playback from the first device.

6. The system of claim 1, wherein the at least one audio transducer comprises a first audio transducer and a second audio transducer, and wherein the program instructions that are executable by the at least one processor such that the system is configured to play back the at least one audio signal via the at least one audio transducer comprise program instructions that are executable by the at least one processor such that the system is configured to:
play back a first audio signal via the first audio transducer in synchrony with playback of a second audio signal via the second audio transducer according to timing data.

7. The system of claim 1, wherein the at least one wearable housing comprises a first wearable housing configured to be worn in a left ear of a user and a second wearable housing configured to be worn in a right ear of the user.

8. The system of claim 1, wherein the audio/video input interface comprises at least one of a (i) high-definition multimedia interface, (ii) an optical digital interface, (iii) a coaxial digital interface, or (iv) a line-in interface.

9. A wearable playback device comprising:
at least one network interface;
at least one audio transducer;
at least one processor;
at least one wearable housing carrying the at least one network interface, the at least one audio transducer; and the at least one processor; and
at least one non-transitory computer-readable medium comprising program instructions that are executable by the at least one processor such that the wearable playback device is configured to:
establish connection of the wearable playback device to a streamer device via a personal area network;
detect a particular set of one or more trigger conditions to transition playback of the audio to the wearable playback device;
in response to detection of the particular set of one or more trigger conditions, cause, via the at least one network interface, the streamer device to send, over the personal area network, at least one audio signal representing the audio in at least one input data stream received via an audio/video input interface of the streamer device;
receive, via the at least one network interface over the personal area network, the at least one audio signal; and
play back the at least one audio signal via the at least one audio transducer.

10. The wearable playback device of claim 9, wherein the particular set of one or more trigger conditions comprises establishment of the connection of the wearable playback device to the streamer device, and wherein the program instructions that are executable by the at least one processor such that the wearable playback device is configured to detect the particular set of one or more trigger conditions comprise program instructions that are executable by the at least one processor such that the wearable playback device is configured to:
detect that the connection of the wearable playback device to the streamer device via the personal area network has been established.

11. The wearable playback device of claim 10, wherein the particular set of one or more trigger conditions comprises a user input to transition playback of the audio to the wearable playback device, and wherein the program instructions that are executable by the at least one processor such that the wearable playback device is configured to detect the particular set of one or more trigger conditions comprise program instructions that are executable by the at least one processor such that the wearable playback device is configured to:
receive, via the at least one network interface, data indicating that the user input to transition playback of the audio to the wearable playback device was received via a mobile device.

12. The wearable playback device of claim 9, wherein the at least one non-transitory computer-readable medium further comprises program instructions that are executable by the at least one processor such that the wearable playback device is configured to:
receive, via the at least one network interface from a mobile device, data representing instructions to adjust playback volume of the at least one audio signal; and
adjust volume that the at least one audio signal is played back via the at least one audio transducer.

13. The wearable playback device of claim 9, wherein the at least one non-transitory computer-readable medium further comprises program instructions that are executable by the at least one processor such that the wearable playback device is configured to:
when playback of the at least one audio signal begins, adjust a volume setting of the wearable playback device to a particular pre-selected volume level corresponding to playback from the streamer device.

14. The wearable playback device of claim 9, wherein the at least one audio transducer comprises a first audio transducer and a second audio transducer, and wherein the program instructions that are executable by the at least one processor such that the wearable playback device is configured to play back the at least one audio signal via the at least one audio transducer comprise program instructions that are executable by the at least one processor such that the wearable playback device is configured to:
play back a first audio signal via the first audio transducer in synchrony with playback of a second audio signal via the second audio transducer according to timing data.

15. The wearable playback device of claim 9, wherein the at least one wearable housing comprises a first wearable housing configured to be worn in a left ear of a user and a second wearable housing configured to be worn in a right ear of the user.

16. At least one non-transitory computer-readable medium comprising program instructions that are executable by at least one processor such that a system is configured to:
receive, via an audio/video input interface of a first device from a television, at least one input data stream comprising audio;
establish connection of a second device to the first device via a personal area network;
detect, via the second device, a particular set of one or more trigger conditions to transition playback of the audio to the second device;
in response to detection of the particular set of one or more trigger conditions, send, via at least one first network interface over the personal area network, at least one audio signal representing the audio in the at least one input data stream;
receive, via at least one second network interface over the personal area network, the at least one audio signal; and
play back the at least one audio signal via at least one audio transducer of the second playback device.

17. The at least one non-transitory computer-readable medium of claim 16, wherein the particular set of one or more trigger conditions comprises establishment of the connection of the second device to the first device, and wherein the program instructions that are executable by the at least one processor such that the system is configured to detect the particular set of one or more trigger conditions comprise program instructions that are executable by the at least one processor such that the system is configured to:
detect that the connection of the second device to the first device via the personal area network has been established.

18. The at least one non-transitory computer-readable medium of claim 17, wherein the particular set of one or more trigger conditions comprises a user input to transition playback of the audio to the second device, and wherein the program instructions that are executable by the at least one processor such that the system is configured to detect the particular set of one or more trigger conditions comprise program instructions that are executable by the at least one processor such that the system is configured to:
   receive, via the at least one second network interface, data indicating that the user input to transition playback of the audio to the second device was received via a mobile device.

19. The at least one non-transitory computer-readable medium of claim 16, wherein the at least one non-transitory computer-readable medium further comprises program instructions that are executable by the at least one processor such that the system is configured to:
   receive, via the at least one second network interface from a mobile device, data representing instructions to adjust playback volume of the at least one audio signal; and
   adjust volume that the at least one audio signal is played back via the at least one audio transducer.

20. The at least one non-transitory computer-readable medium of claim 16, wherein the at least one non-transitory computer-readable medium further comprises program instructions that are executable by the at least one processor such that the system is configured to:
   when playback of the at least one audio signal begins, adjust a volume setting of the second device to a particular pre-selected volume level corresponding to playback from the first device.

\* \* \* \* \*